United States Patent
Li et al.

(10) Patent No.: US 11,563,545 B2
(45) Date of Patent: Jan. 24, 2023

(54) HARQ-ACK TRANSMISSION AND RETRANSMISSION IN WIRELESS COMMUNICATION SYSTEMS

(71) Applicant: Intel Corporation, Santa Clara, CA (US)

(72) Inventors: Yingyang Li, Beijing (CN); Yongjun Kwak, Portland, OR (US); Tom Cruz, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 16/724,180

(22) Filed: Dec. 20, 2019

(65) Prior Publication Data

US 2020/0127796 A1 Apr. 23, 2020

Related U.S. Application Data

(60) Provisional application No. 62/842,398, filed on May 2, 2019, provisional application No. 62/824,721, filed
(Continued)

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1812* (2013.01); *H04L 5/001* (2013.01);
(Continued)

(58) Field of Classification Search
CPC ..... H04L 5/0055; H04L 1/1812; H04L 5/001; H04L 1/1822; H04L 1/1854;
(Continued)

(56) References Cited

U.S. PATENT DOCUMENTS

| 9,888,465 B2 * | 2/2018 | Papasakellariou .... H04L 5/0055 |
| 2010/0169733 A1 * | 7/2010 | Kim ...................... H04L 1/1867 |
| | | 714/E11.131 |

(Continued)

FOREIGN PATENT DOCUMENTS

CN 101578899 A * 11/2009 ............. H04L 1/003

*Primary Examiner* — Hardikkumar D Patel
(74) *Attorney, Agent, or Firm* — Schwegman Lundberg & Woessner, P.A.

(57) ABSTRACT

An apparatus of user equipment (UE) includes processing circuitry coupled to a memory, where to configure the UE for HARQ-ACK transmission in an NR network, the processing circuitry is to decode DCI received via a PDSCH. The DCI includes resource assignments, a set index, and a reset indicator for a set of PDSCHs. Downlink data associated with the set index and received via the set of PDSCHs using the resource assignments is decoded. A PUCCH is encoded for transmission to a base station to include a HARQ-ACK of the decoded downlink data associated with the set index. The PUCCH is encoded to further include a second HARQ-ACK for a prior PDSCH reception, when the prior PDSCH reception includes PDSCHs associated with the set index and the reset indicator matches a reset indicator of the prior PDSCH reception.

20 Claims, 15 Drawing Sheets

Related U.S. Application Data on Mar. 27, 2019, provisional application No. 62/805,268, filed on Feb. 13, 2019, provisional application No. 62/790,859, filed on Jan. 10, 2019.

(51) Int. Cl.
*H04W 72/12* (2009.01)
*H04W 28/04* (2009.01)
*H04W 72/14* (2009.01)

(52) U.S. Cl.
CPC ....... *H04W 28/04* (2013.01); *H04W 72/1273* (2013.01); *H04W 72/14* (2013.01)

(58) Field of Classification Search
CPC ... H04L 1/1861; H04L 1/1887; H04L 5/0053; H04L 5/0091; H04L 5/0007; H04L 1/1864; H04L 1/0045; H04L 5/0094; H04L 1/0072; H04L 5/14; H04W 28/04; H04W 72/1273; H04W 72/14; H04W 76/28; H04W 52/0216; H04W 52/0229; H04W 76/15; H04W 72/042; Y02D 30/70
See application file for complete search history.

(56) References Cited

U.S. PATENT DOCUMENTS

| | | | |
|---|---|---|---|
| 2014/0269453 A1* | 9/2014 | Papasakellariou | H04L 1/1854 370/280 |
| 2015/0281912 A1* | 10/2015 | Cai | H04L 1/1671 370/329 |
| 2016/0219557 A1* | 7/2016 | He | H04L 5/0053 |
| 2017/0207895 A1* | 7/2017 | Yang | H04L 5/0048 |
| 2018/0278379 A1* | 9/2018 | Sun | H04L 1/1614 |
| 2018/0352545 A1* | 12/2018 | Takeda | H04L 1/1861 |
| 2019/0074937 A1* | 3/2019 | Bhattad | H04L 1/1819 |
| 2019/0150122 A1* | 5/2019 | Ying | H04L 5/0053 370/329 |
| 2019/0150171 A1* | 5/2019 | Hwang | H04W 72/0406 370/329 |
| 2019/0181988 A1* | 6/2019 | Gao | H04L 1/16 |
| 2020/0022175 A1* | 1/2020 | Xiong | H04L 1/1861 |
| 2021/0050949 A1* | 2/2021 | Tang | H04W 72/042 |

* cited by examiner

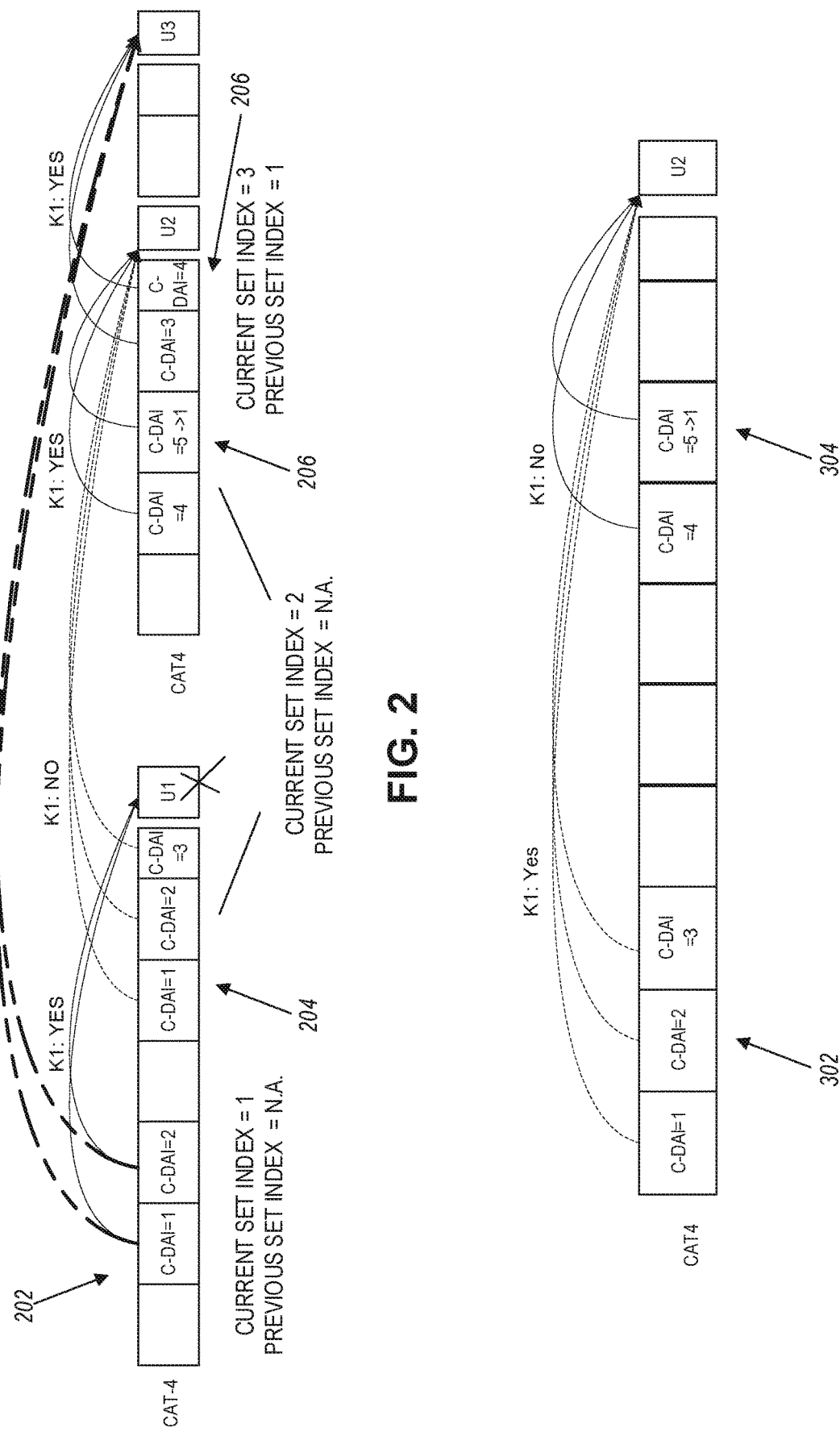

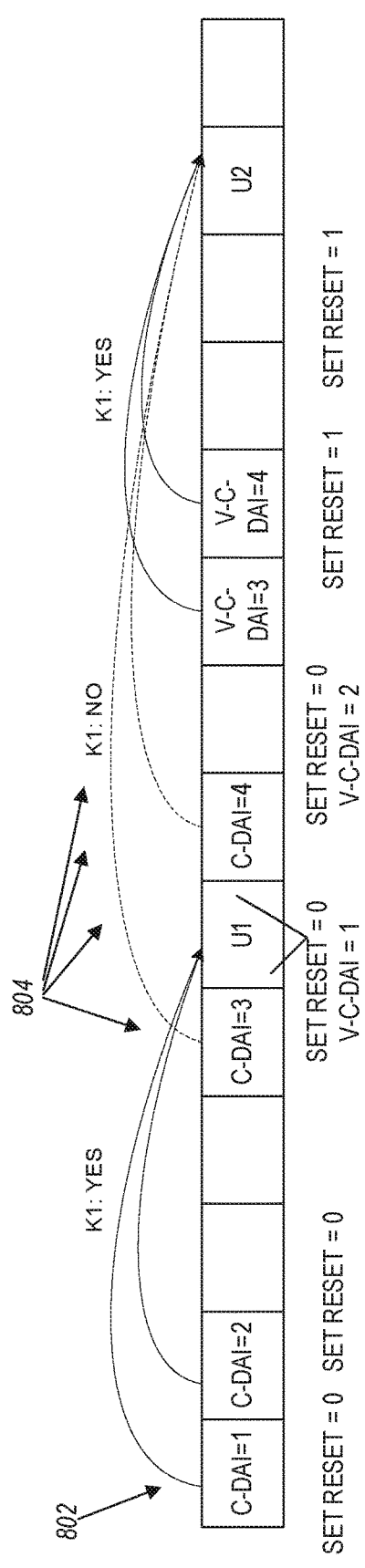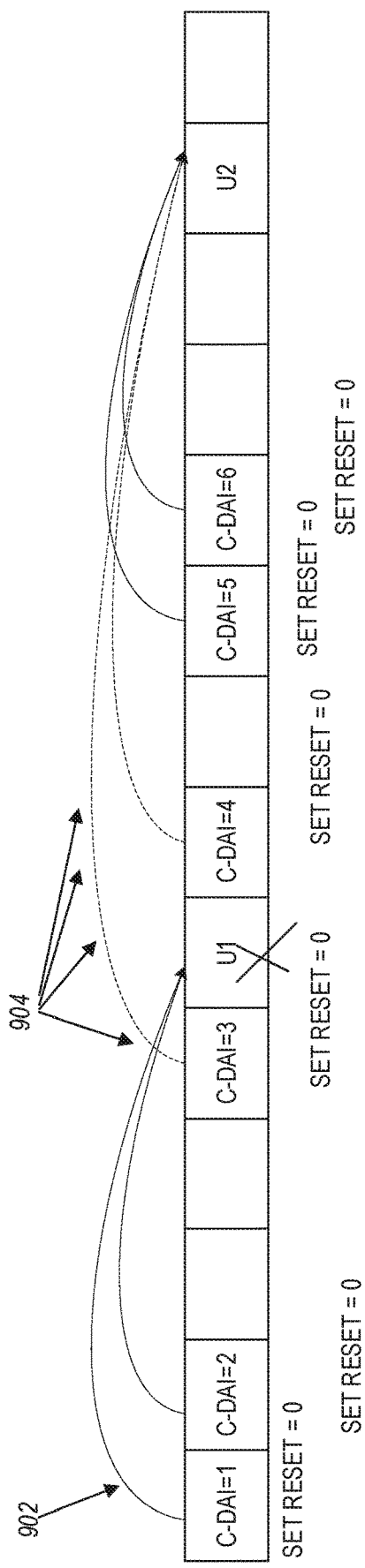
FIG. 8
FIG. 9

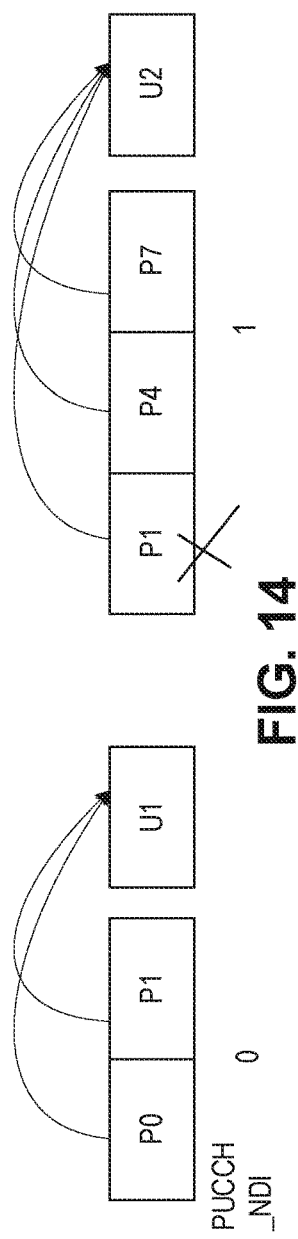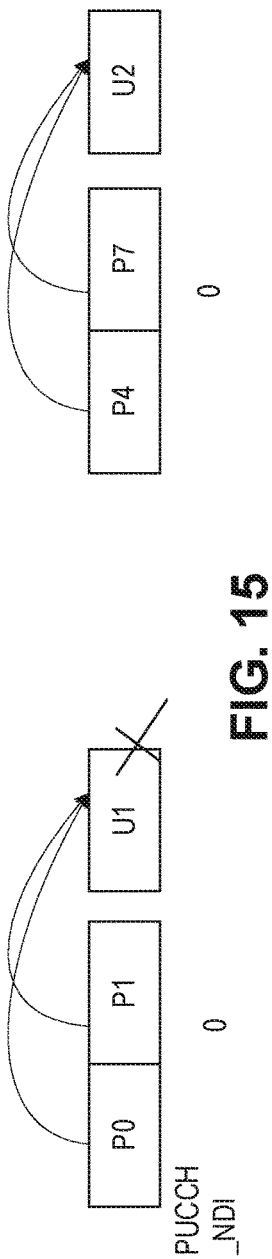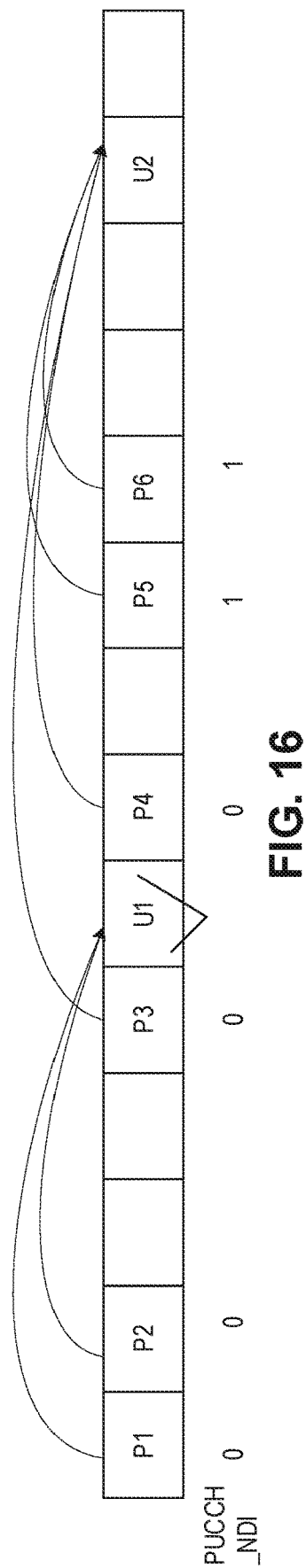

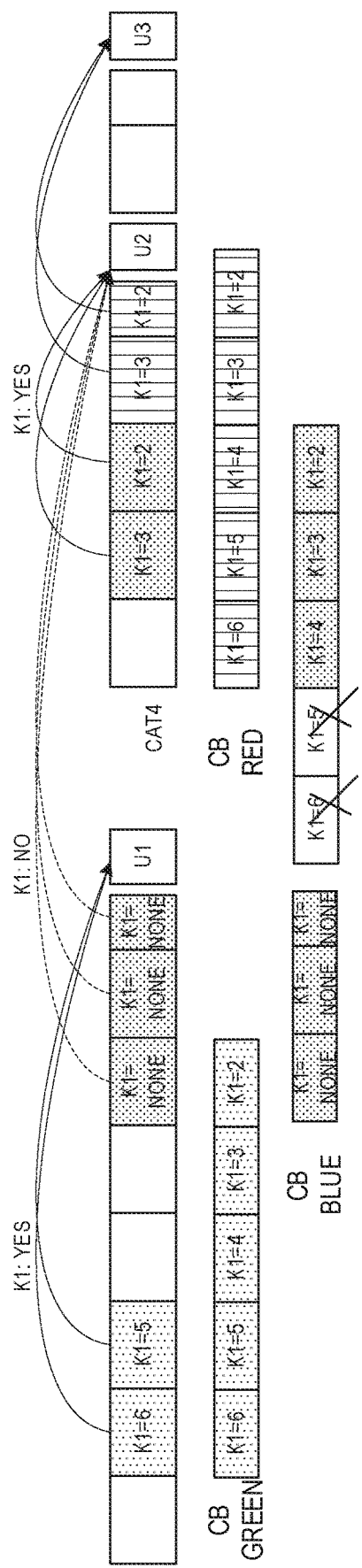
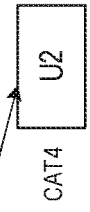
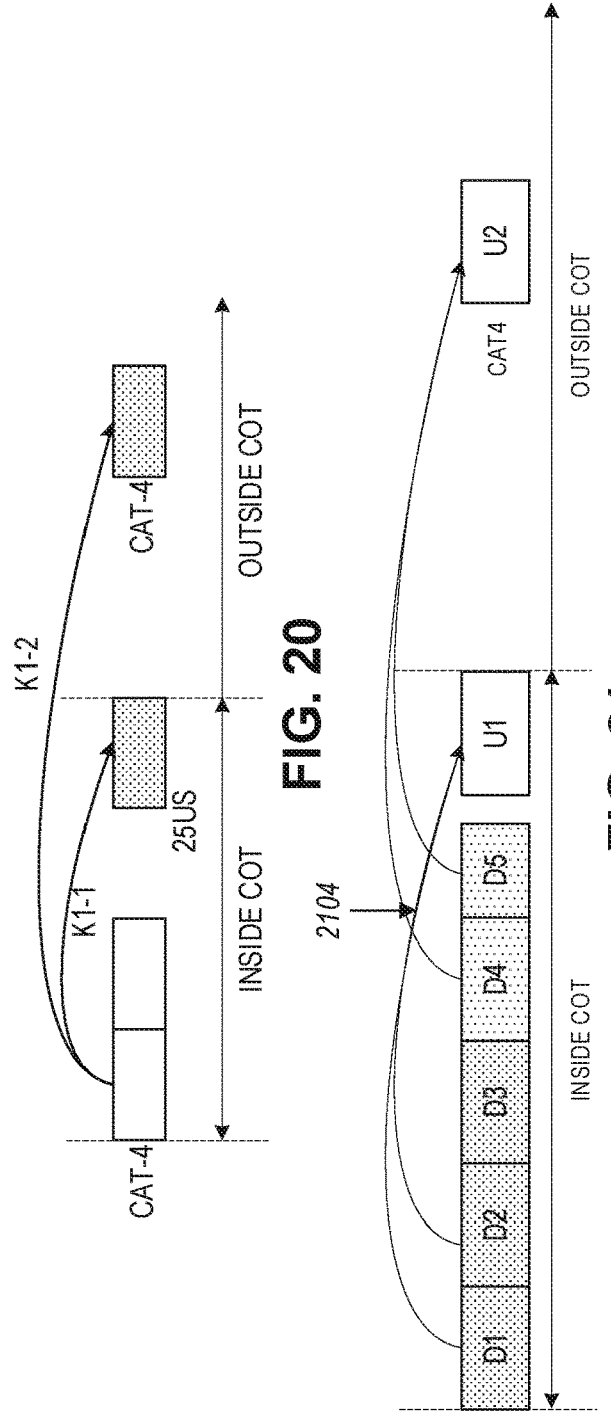
FIG. 19
FIG. 20
FIG. 21

HARQ-ACK TRANSMISSION AND RETRANSMISSION IN WIRELESS COMMUNICATION SYSTEMS

PRIORITY CLAIM

This application claims the benefit of priority to the following U.S. Provisional Patent Applications:

U.S. Provisional Patent Application Ser. No. 62/790,859, filed Jan. 10, 2019, and entitled "HARQ-ACK TRANSMISSION AND RETRANSMISSION IN WIRELESS COMMUNICATION SYSTEM;"

U.S. Provisional Patent Application Ser. No. 62/805,268, filed Feb. 13, 2019, and entitled "HARQ-ACK TRANSMISSION AND RETRANSMISSION IN WIRELESS COMMUNICATION SYSTEM;"

U.S. Provisional Patent Application Ser. No. 62/824,721, filed Mar. 27, 2019, and entitled "HARQ-ACK TRANSMISSION AND RETRANSMISSION IN WIRELESS COMMUNICATION SYSTEM;" and U.S. Provisional Patent Application Ser. No. 62/842,398, filed May 2, 2019, and entitled "HARQ-ACK TRANSMISSION AND RETRANSMISSION IN WIRELESS COMMUNICATION SYSTEM."

Each of the above-listed applications is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks, 5G-LTE networks, and 5G NR unlicensed spectrum (NR-U) networks. Other aspects are directed to enhancements for hybrid automatic repeat request (HARQ) acknowledgment (ACK) transmissions and retransmissions in wireless communication systems, including new radio (NR) communication systems.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and is operational and capital expenditures. 5G-NR networks will continue to evolve based on 3GPP LTE-Advanced with additional potential new radio access technologies (RATS) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called. MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include methods for HARQ-ACK transmission and retransmission in wireless communication systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 2 illustrates a HARQ-ACK codebook based on a current set index in a previous set index, in accordance with some aspects.

FIG. 3 illustrates HARQ-ACK with undefined K1 values, in accordance with some aspects.

FIG. 7-FIG. 12 illustrate HARQ-ACK transmissions for a set of PDSCHs, in accordance with some aspects.

FIG. 14 and FIG. 15 illustrate the uses of PUCCH_NDI, in accordance with some aspects.

FIG. 16 and FIG. 17 illustrate HARQ-ACK transmissions for a set of PDSCHs, in accordance with some aspects.

FIG. 19 illustrates a semi-static HARQ-ACK codebook considering PDSCHs without PDSCH-to-HARQ-ACK timings, in accordance with some aspects.

FIG. 20 illustrates different LBT types for multiple K1 values, in accordance with some aspects.

FIG. 21 illustrates a cat for LBT used in outside COT, in accordance with some aspects.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects set forth in the claims encompass all available equivalents of those claims.

Figure 1A:
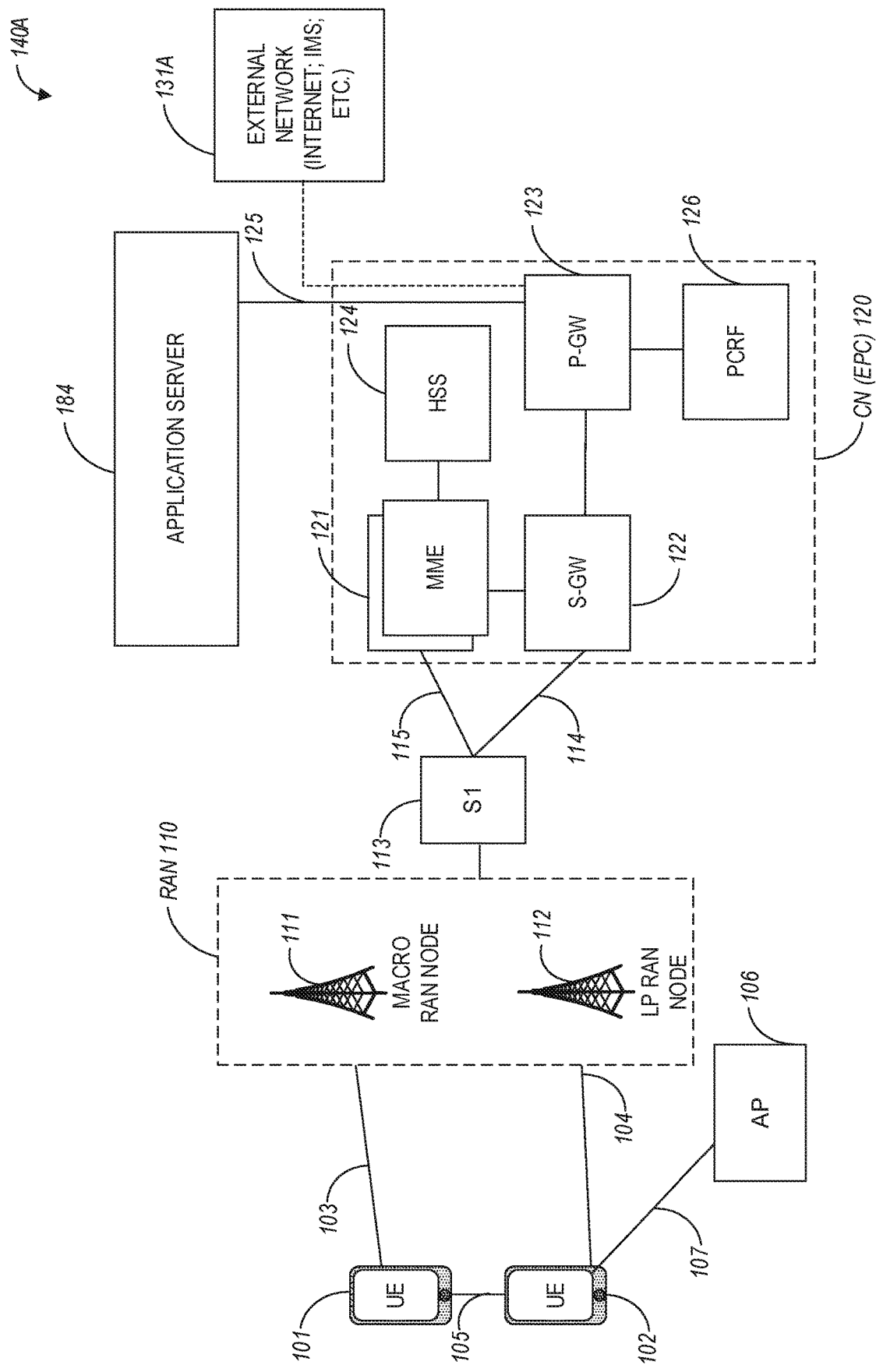
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for LTE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (MIS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MMF) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The NAIFs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
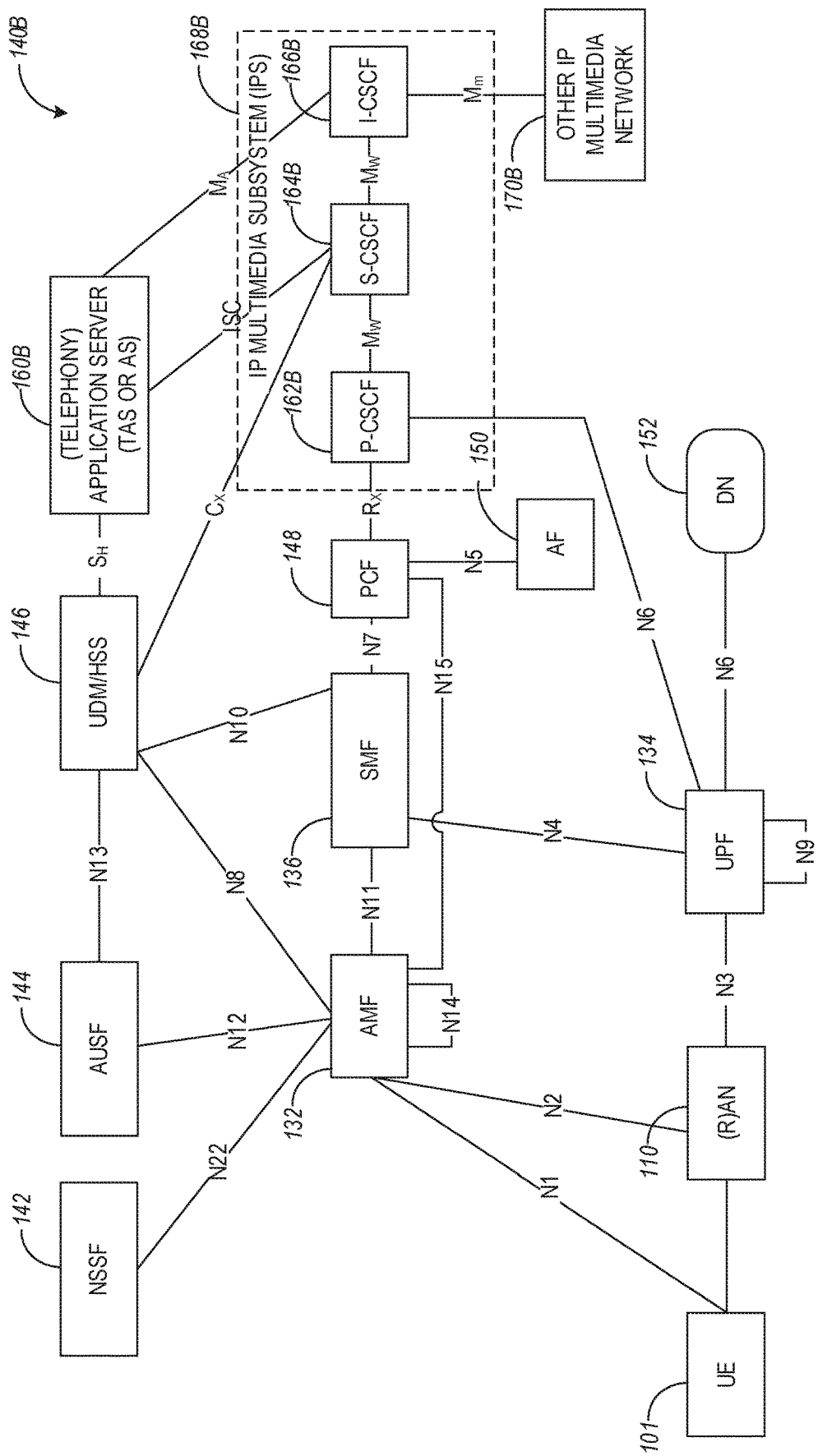
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (ANTE) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B, The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operators network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 19 illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMT 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
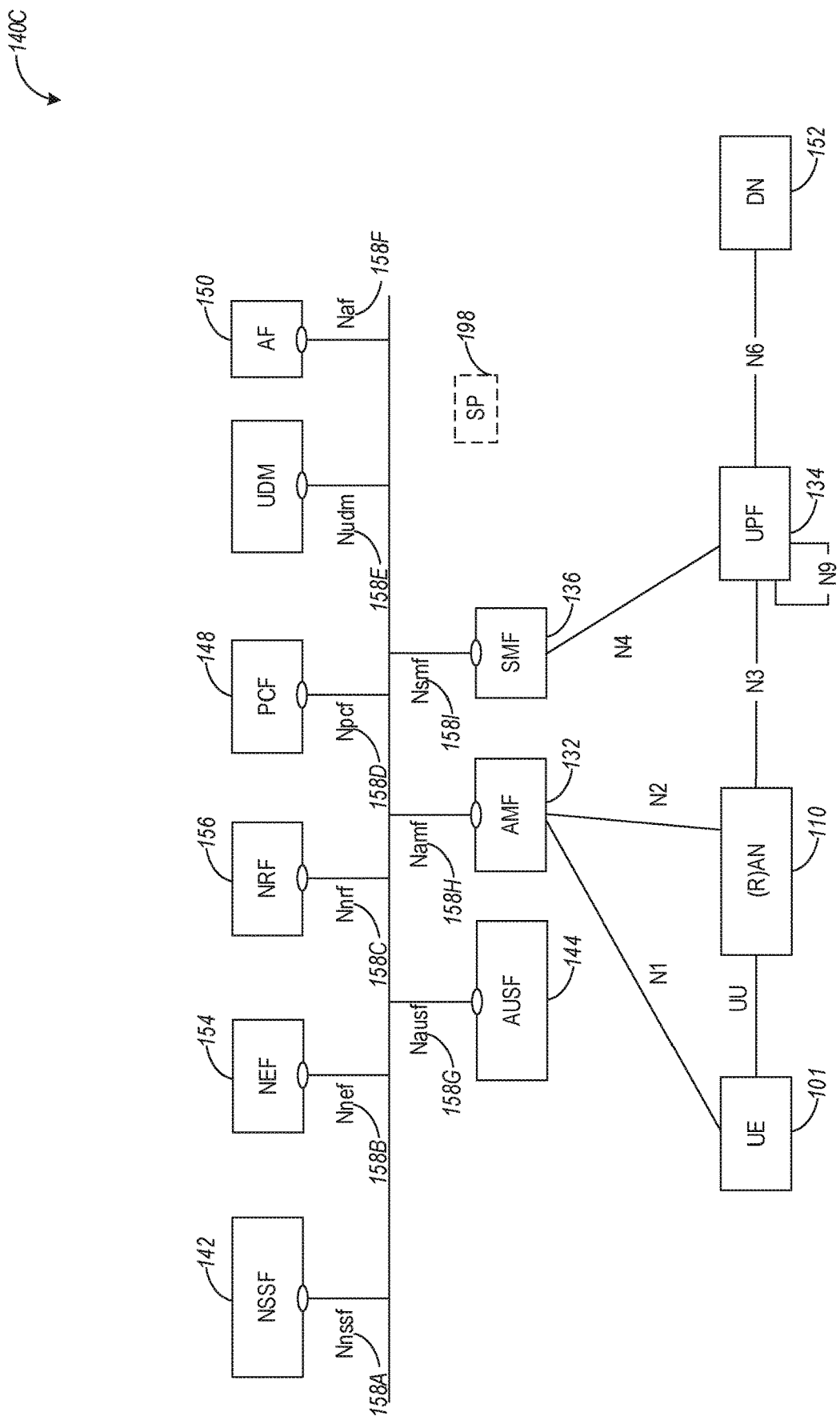

FIG. 1C illustrates a 5G system architecture 140C and a service-based representation. In addition to the network entities illustrated in FIG. system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE or a base station (e.g., any of the UEs or base stations illustrated in connection with FIG. 1A-FIG. 1C).

Each year, the number of mobile devices connected to wireless networks significantly increases. In order to keep up with the demand in mobile data traffic, necessary changes have to be made to system requirements to be able to meet these demands. Three critical areas that need to be enhanced in order to deliver this increase in traffic are larger bandwidth, lower latency, and higher data rates.

One of the limiting factors in wireless innovation is the availability in the spectrum. To mitigate this, the unlicensed spectrum has been an area of interest to expand the availability of LTE. In this context, one of the major enhancement for LTE in 3GPP Release 13 has been to enable its operation in the unlicensed spectrum via Licensed-Assisted. Access (LAA), which expands the system bandwidth by utilizing the flexible carrier aggregation (CA) framework introduced by the LTE-Advanced system. Now that the main building blocks for the framework of NR have been established, a natural enhancement is to allow this to also operate on unlicensed spectrum. New objectives can include HARQ operation issues. NR HARQ feedback mechanisms are the baseline for NR-U operation with extensions in line with agreements during the study phase including immediate transmission of HARQ acknowledgment/non-acknowledgment (ACK/NACK or A/N) for the corresponding data in the same shared channel occupancy time (COT) as well as transmission of HARQ A/N in a subsequent COT. Potentially support mechanisms to provide multiple and/or supplemental time and/or frequency domain transmission opportunities.

One of the challenges, in this case, is that this system must maintain fair coexistence with other incumbent technologies, and in order to do so, some restrictions may need to be taken into account when designing this system, depending on the particular band in which it may operate on. For instance, if operating in the 5 GHz band, a listen before talk (LBT) procedure needs to be performed to acquire the medium before a transmission can occur. For this reason, the HARQ feedback mechanism, which is tight to specific timing and operation when operating NR in the licensed band must be enhanced and modified to accommodate this constraint when performing transmission on an unlicensed band. In order to overcome this issue, this disclosure provides details on how to enhance the scheduling procedure and HARQ timing procedure of NR in order to allow for an efficient way to operate in the unlicensed spectrum.

In an NR system operating on an unlicensed spectrum, since transmission is conditional to the success of the LBT procedure, the NR HARQ feedback mechanism is no longer applicable. Motivated by this, this disclosure provides details on how to enhance the HARQ timing procedure of NR in order to allow an efficient way to operate in the unlicensed spectrum.

In NR Rel-15, both dynamic HARQ-ACK codebook and semi-static HARQ-ACK codebook are supported. The two schemes could be enhanced by taking into account the effects of missing PUCCH transmission at UE and/or PUCCH decoding error at gNB. Consequently, the enhanced schemes can better support the operation for NR unlicensed (NR-U).

In a PUCCH transmission timing, the UE may fail to pass LBT hence there is no way to actually transmit the PUCCH carrying a set of HARQ-ACK. To avoid enforcing gNB to retransmit all the PDSCHs corresponding to the set of HARQ-ACK, it needs to support the transmission of the set of HARQ-ACK at a later time.

For a PUCCH transmission from the UE, due to the potential hidden nodes or other factors, it is possible gNB cannot correctly decode the PUCCH. The gNB does not know about the success/failure status of the related PDSCHs. To avoid enforcing the gNB to retransmit all the PDSCHs corresponding to the set of HARQ-ACK, it needs to support the transmission of the set of HARQ-ACK at a later time.

Dynamic HARQ-ACK Transmission

In a dynamic HARQ-ACK codebook, i.e. type 2 HARQ-ACK codebook in NR Rel-15, counter downlink assignment index (C-DAI) is used to sort the HARQ-ACK bits, and total DAI (T-DAT) is used to derive the codebook size. In case a set of HARQ-ACKs fails for transmission, one issue is how to make sure gNB and UE has the same understanding on the missing of this set of HARQ-ACKs, otherwise, gNB and UE may not have same understanding a HARQ-ACK codebook size when the set of HARQ-ACKs is transmitted or retransmitted in a future time possibly together with other old or new HARQ-ACK bits. One more issue is how to deal with C-DAI and T-DAI when the set of HARQ-ACK is transmitted or retransmitted in a future time possibly together with other old or new HARQ-ACK bits.

In one embodiment, a set index is assigned to a set of PDSCHs. The gNB can assign a different set index for a different set of PDSCHs scheduled at a different time. For example, a set of PDSCHs has the same set index if the initial HARQ-ACK transmission of them uses the same PUCCH channel. The gNB may trigger HARQ-ACK transmission for a current set of PDSCH and if needed a previous set of PDSCH. When a PDSCH is scheduled by a DCI, the DCI will include all or part of the following information, by dedicated field(s) or jointly interpreted with other information:

One indication for the current set of PDSCHs, i.e. a current set index;
One indication to a previous set of PDSCH whose HARQ-ACK needs to be transmitted or retransmitted together with the current set of PDSCHs, i.e. a previous set index;
C-DAI: if the above previous set index indicates a valid previous set, the C-DAI will be incremented based on the last DCI of the previous set, so that C-DAI of both previous set and current set can be continuous; otherwise, C-DAI starts from value 1; and
T-DAI: if the above previous set index indicates a valid previous set, T-DAI will indicate the total number of DCIS until now in the previous set and the current set; otherwise, T-DAI only indicates the total number of DCIs until now in the current set.

FIG. 2 illustrates a HARQ-ACK codebook based on a current set index in a previous set index, in accordance with some aspects. As shown in FIG. 2, the set of PDSCH 202 with C-DAI=1 and 2 with current set index=1 fails in HARQ-ACK transmission in PUCCH resource U1. After knowing this case, the gNB decides to retransmit it together with a new set of PDSCH 208 with the current set index=3 by setting the previous set index=1. The C-DAI of the new set will be counted as 3 and 4, which follows the 2 PDSCHs 204 and 206 from the previous set 1.

In one embodiment, in a DCI scheduling a PDSCH, if there is no information on PDSCH-to-HARQ-ACK timing (e.g., K1 parameter), the current set index still indicates a valid set index. HARQ-ACK for the set of PDSCH without valid PDSCH-to-HARQ-ACK timing will be transmitted together with a set of PDSCHs with valid PDSCH-to-HARQ-ACK timing with the same current set index. PDSCH-to-HARQ-ACK timing and PUCCH resource for the HARQ-ACK transmission is indicated by the DCI scheduling a PDSCH with valid PDSCH-to-HARQ-ACK timing for the same set of PDSCHs. C-DAI and T-DAI will count PDSCHs with the same current set index continuously, possibly together with a previous set of PDSCHs which is transmitted in the previous channel occupancy time (COT). Within the same set of PDSCHs, a PDSCH without valid PDSCH-to-HARQ-ACK timing can be scheduled only earlier than a PDSCH with valid PDSCH-to-HARQ-ACK timing. Alternatively, within a same set of PDSCHs, a PDSCH without valid PDSCH-to-HARQ-ACK timing could be scheduled earlier than, later than or at the same timing with a PDSCH with valid PDSCH-to-HARQ-ACK timing. For example, for a UE configured with carrier aggregation, a PDSCH with valid PDSCH-to-HARQ-ACK timing is scheduled on a carrier, while another PDSCH in the same timing could be scheduled without valid PDSCH-to-HARQ-ACK timing in another carrier.

FIG. 3 illustrates HARQ-ACK with undefined K1 values, in accordance with some aspects. FIG. 3 is showing the case that a PDSCH 304 without valid PDSCH-to-HARQ-ACK timing is scheduled later than the PDSCH 302 with valid PDSCH-to-HARQ-ACK timing. This case can be used when the K1 value is not applicable when the PDSCH is scheduled.

In another embodiment, a set index is assigned to a set of PDSCHs. A HARQ-ACK is determined for the set of PDSCHs with the same set index. The set of PDSCHs includes all PDSCHs with the same set index whose HARQ-ACK is not successfully transmitted yet unless some other criteria for dropping HARQ-ACK for a PDSCH is satisfied. There could be multiple sets of PDSCHs with different set indexes, e.g. a 2-bit set index can support up to 4 sets of PDSCHs, where the size of the set indexes can be configured by RRC (either by UE-specific manner or by cell-specific manner) or fixed in the specification. A set of PDSCHs may include multiple subsets of PDSCHs. Herein, a subset of PDSCHs may be allocated a PUCCH resource for the first time, or may never be assigned a PUCCH resource yet, or may be already assigned a PUCCH resource in earlier time for one or more times but failed in HARQ-ACK transmission due to LBT failure and/or gNB detection error. There could be no limitations on the time resources of the different sets of PDSCHs. The different sets of PDSCHs could be mapped different time window not overlapped. The subset of PDSCHs from a different set of PDSCHs could be mapped to different non-overlapped time windows, while the subsets of PDSCHs from a different set of PDSCHs could be interleaved. Alternatively, the PDSCHs from different sets of PDSCHs could be interleaved.

Figure 4:
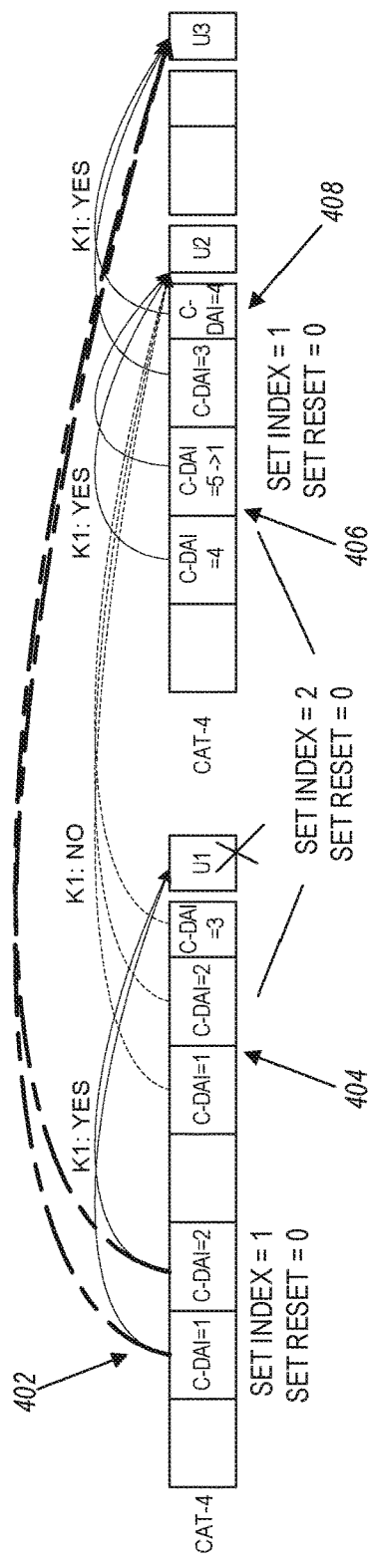
FIG. 4 illustrates a HARQ-ACK codebook based on a set index and reset indication toggled, in accordance with some aspects.

FIG. 4 illustrates a HARQ-ACK codebook based on a set index and a reset indication toggled, in accordance with some aspects.

Figure 5:
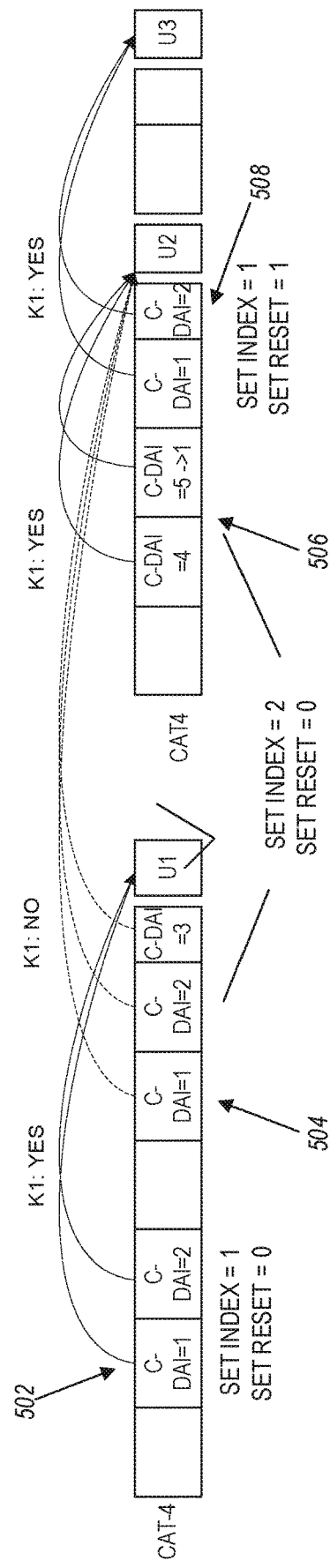
FIG. 5 illustrates a HARQ-ACK codebook based on a set index a reset indication toggled, in accordance with some aspects.

FIG. 5 illustrates a HARQ-ACK codebook based on a set index a reset indication toggled, in accordance with some aspects.

Preferably, a subset of a set of PDSCHs could include the PDSCHs whose HARQ-ACKs are expected to transmit on the same PUCCH resource for the first time HARQ-ACK feedback. As shown in FIG. 4, the PDSCHs 404 with C-DAT equals to 1, 2, 3 could be considered as in the same subset as PDSCHs 406 with C-DAI equals to 4, 5. The value 5 is indicated as value 1 if modulo 4 operation is done. Preferably, there is enough gNB processing time between a PUCCH resource for a subset and a DCI scheduling PDSCH in a followed subset. However, the exact timing between different subsets and the related PUCCHs is not limited in this disclosure and could be up to gNB implementation.

When a PDSCH is scheduled by a DCI, the DCI will include all or part of the following information, e.g. by dedicated field(s) or jointly interpreted with other information:

One indication for a set of PDSCHs, i.e. a set index, HARQ-ACK for all PDSCHs scheduled by DCI with the same set index (not reset yet, i.e. reset indicator is not toggled) should be reported at currently indicated PUCCH resource. Herein, the currently indicated PUCCH resource could be derived by the last DCI scheduling PDSCH(s) in the set of PDSCHs;

One indication to reset a set of PDSCHs, the reset indicator can operate in a toggle or not toggle manner like a new data indicator (NDI) field. Once reset indicator is toggled, HARQ-ACK for all earlier PDSCHs with reset indicator not toggled are omitted in HARQ-ACK transmission. That is, if a PDSCH X and all following PDSCH(s) in the set of PDSCHs are scheduled with DCIs indicating the same value of reset indicator as the last DCI indicating the PUCCH resource, the reported HARQ-ACK codebook includes HARQ-ACK for the PDSCH X;

C-DAT: C-DAI is incremented across all DCIs with the same set index if the reset indicator is not toggled. The first DCI with toggled reset indicator will have C-DAI equal to 1; and T-DAI: T-DAI indicates the total number of DCIs till now across all DCIs with the same set index with reset indication not toggled.

As shown in FIG. 4, PDSCHs 402 with C-DAI=1 and 2 with set index=1 with reset indicator=0 fail in HARQ-ACK transmission in PUCCH resource U1. After knowing this case, the gNB decides to retransmit it together with HARQ-ACK for PDSCHs 408 (following 404 and 406), the same set index=1 is assigned for the dark red PDSCHs with reset indicator=0 (i.e. not toggled). In this case, the C-DAI of PDSCHs 408 will be counted as 3 and 4 which follows the two PDSCHs 402 with set index 1. In this way, HARQ-ACK transmission in PUCCH resource U3 includes HARQ-ACK for all 4 PDSCHs.

On the other hand, as shown in FIG. 5, if the gNB receives the HARQ-ACK for PDSCHs 502 with set index 1 and gNB still wants to use set index 1, the gNB could indicate set index=1 with reset indicator=1 (i.e. toggled) for PDSCHs 508. In this case, C-DAI of PDSCHs 508 will be counted as 1 and 2, i.e. C-DAI counting is restarted. In this way, the HARQ-ACK transmission in PUCCH resource U3 only includes HARQ-ACK for the two PDSCHs 508, following PDSCHs 504 and 506.

In one embodiment, as shown in FIG. 4 and FIG. 5, in a DCI scheduling a PDSCH, if there is no information on PDSCH-to-HARQ-ACK timing, the set index still indicates a valid set index. HARQ-ACK for the set of PDSCH without valid PDSCH-to-HARQ-ACK timing will be transmitted together with a set of PDSCHs with valid PDSCH-to-HARQ-ACK timing with same set index. PDSCH-to-HARQ-ACK timing and PUCCH resource for the HARQ-ACK transmission is indicated by the DCI scheduling a PDSCH with valid PDSCH-to-HARQ-ACK timing for the same set of PDSCHs. The C-DAI and T-DAI will count PDSCHs with the same set index continuously. Within the same set of PDSCHs, a PDSCH without valid PDSCH-to-HARQ-ACK timing can be scheduled only earlier than a PDSCH with valid PDSCH-to-HARQ-ACK timing. Alternatively, within the same set of PDSCHs, a PDSCH without valid PDSCH-to-HARQ-ACK timing could be scheduled earlier than, later than, or at the same timing with a PDSCH with valid PDSCH-to-HARQ-ACK timing. For example, for a UE configured with carrier aggregation, a PDSCH with valid PDSCH-to-HARQ-ACK timing is scheduled on a carrier, while another PDSCH in the same timing could be scheduled without valid PDSCH-to-HARQ-ACK timing in another carrier.

Figure 6:
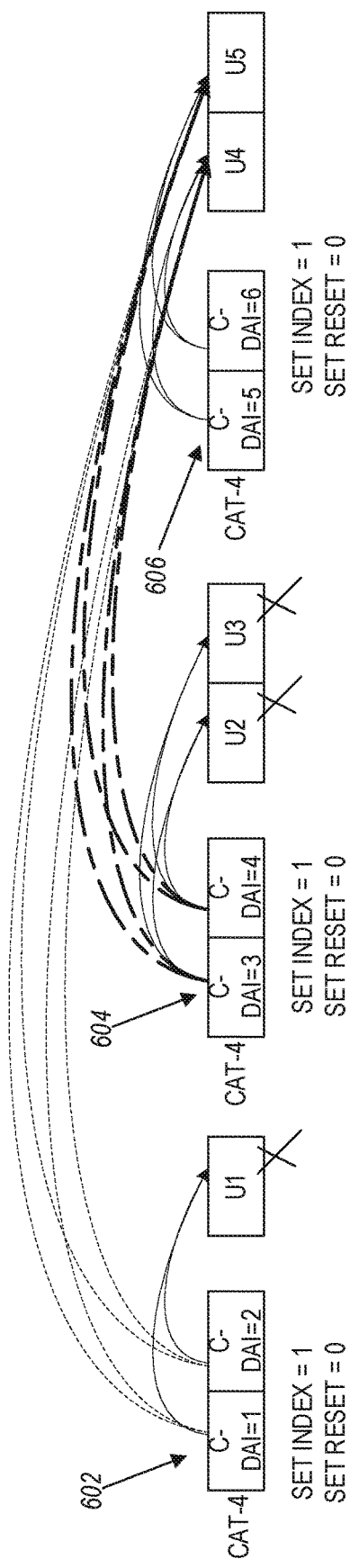
FIG. 6 illustrates multiple K1 values indicated by the DCI, in accordance with some aspects.

FIG. 6 illustrates multiple K1 values indicated by the DCI, in accordance with some aspects. In one embodiment, assuming a DCI could indicate one or multiple values of K1 for PDSCH-to-HARQ-ACK timings, the HARQ-ACK codebook could still be determined by set index, reset indicator, C-DAI/T-DAI. As shown in FIG. 6, PDSCHs 602 with C-DAI=1 and 2 with set index=1 with reset indicator=0 fails in HARQ-ACK transmission in PUCCH resource U1. After knowing this case, the gNB decides to retransmit it together with HARQ-ACK for two PDSCHs 604, the same set index=1 is assigned for the blue PDSCHs with reset indicator=0 (i.e. not toggled). C-DAI of PDSCHs 604 will be counted as 3 and 4 which follows the two PDSCHs 602 with set index 1. In this way, HARQ-ACK transmission in PUCCH resource U2 or U3 includes HARQ-ACK for 4 PDSCHs.

However, though gNB provides two opportunities for LBT operation of PUCCH, it is still possible that the LBT could fail or the gNB does not receive the PUCCH. In this case, the gNB may decide to retransmit HARQ-ACK for all 4 PDSCHs together with HARQ-ACK for PDSCHs 606, the same set index=1 is assigned for PDSCHs 606 with reset indicator=0 (i.e. not toggled). In this case, the C-DAI of PDSCHs 606 will be counted as 5 and 6 which follows PDSCHs 604 with set index 1. Value 5 and 6 are indicated as values 1 and 2 if modulo 4 operation is done. In this way, the HARQ-ACK transmission in PUCCH resource U4 or U5 includes HARQ-ACK for all 6 PDSCHs.

In one embodiment, when the gNB schedules a PDSCH by a DCI, the gNB may want to trigger transmission or retransmission of HARQ-ACK for earlier PDSCHs without HARQ-ACK for current PDSCHs. A separated bit can be included in DCI to indicate such operation. If the separated bit is set, it is to report the HARQ-ACK for earlier PDSCHs only. The K1 parameter indicates a PDSCH-to-HARQ-ACK timing related to the currently scheduled PDSCH and ARI indicates a PUCCH resource. The derived PUCCH resource by K1 and ARI may be used for the HARQ-ACK transmission of earlier PDSCHs only. A TPC, set index, and restart indication are determined as is. The T-DAI can be reinterpreted as an indicator of the set index of a set of earlier PDSCHs for which the HARQ-ACK is triggered; however, C-DAI is still used as a counter for HARQ-ACK ordering of current PDSCH(s). Preferably, the indicated set index by T-DAT is different from the set index in the DCI. That is, the DCI is triggering HARQ-ACK transmission for a set of PDSCHs with a different set index from the current scheduled PDSCH. Otherwise, it may cause confusion on how to interpret the reset indicator. If the separated bit is not set, HARQ-ACK for earlier PDSCHs, if existed, are transmitted together with currently scheduled PDSCH as disclosed in other embodiments.

FIG. 7-FIG. 12 illustrate HARQ-ACK transmissions for a set of PDSCHs, in accordance with some aspects. In some aspects, a subset of a set of PDSCHs could include the PDSCHs whose HARQ-ACKs are expected to transmit on the same PUCCH resource for the first time HARQ-ACK feedback. As shown in FIG. 7-FIG. 12, two PDSCHs (702, 802, 902, 1002, 1102, 1202) belong to a first subset, while 4 PDSCHs (704, 804, 904, 1004, 1104, 1204) belong to a second subset. For consecutive subsets, there may not be enough gNB processing time between a PUCCH resource for the first subset(s) and one or more DCIs scheduling PDSCHs in the second subset. The first subset(s) may be strictly a single subset of the set of PDSCHs, or the first subset(s) could be multiple consecutive subsets having the same value of reset indicator. The value of reset indicator in the above mentioned one or more DCIs could be different from the value of reset indicator in the other DCIs of the second subset. The reset indicator in the other DCIs of the second subset is used to determine the HARQ-ACK transmission of all PDSCHs in the second subset. If no DCI in the 2nd subset other than the above mentioned one or more DCIs is received, the reset indicator in the above mentioned one or more DCIs is used to determine HARQ-ACK transmission of the second subset. Alternatively, the reset indictor in a later DCI scheduling the set of PDSCHs is used to derive the effective reset indicator of the second subset.

In the above mentioned one or more DCIs, since the gNB does not know whether HARQ-ACK of PDSCHs in the first subset(s) can be received or not due to insufficient processing time, the gNB could keep the reset indicator unchanged. Alternatively, the gNB and the UE may just neglect the value of reset indicator in the above mentioned one or more DCIS. According to a DCI in the 2nd subset other than the above mentioned one or more DCIs, if the reset indicator is not toggled, the HARQ-ACK for all the above consecutive subsets are transmitted. Otherwise, if the reset indicator is toggled, only the HARQ-ACK for all PDSCHs in the second subset is reported. If no DCI in the 2nd subset other than the above mentioned one or more DCIs is received, the UE could skip HARQ-ACK transmission, or the UE could report the HARQ-ACK for PDSCHs in the first subset(s) and also for PDSCHs scheduled by the above mentioned one or more DCIs in a PUCCH indicated by a DCI of the second subset. If no DCI in the 2nd subset other than the above mentioned one or more DCIs is received, assuming UE does not transmit PUCCH carrying HARQ-ACK, an additional DCI may trigger the HARQ-ACK retransmission by scheduling the same set of PDSCHs at a later time. That is, the reset indicator of the later DCI equals the effective reset indicator of the second subset, and also determine whether to retransmit HARQ-ACK for PDSCHs in the first subset(s).

In one embodiment, for the above consecutive subsets, two different indications of C-DAI/T-DAI could be indicated at least in the above mentioned one or more DCIs. The above two indications of C-DAI/T-DAI can be explicitly included as separate fields in a DCI. Alternatively, one indication of C-DAI/T-DAI (indication A) is included as a field in a DCI, while the other indication of C-DAI/T-DAI (indication B) is only indicated in the above mentioned one or more DCIs by reinterpreting another existing field (or fields), for example, TPC or RAI. In all the above consecutive subsets, at least one C-DAI/T-DAI is indicated. In the DCIs which are not the above mentioned one or more DCIs, there is just one-DAI/T-DAI that is indicated. For those DCI, the gNB may provide indication A or indication B depending on the HARQ-feedback situation. The gNB may toggle the reset indicator to indicate if indication B is included, while indication A is included otherwise. From a UE perspective, depending on whether the reset indicator is toggled or not, the UE may know which indication is received between indication A and indication B. Indication A of C-DAI/T-DAI counts the number of PDSCHs in all the above consecutive subsets, still denoted as C-DAI/T-DAI in the following. Indication B of C-DAI/T-DAI only counts the number of PDSCHs in the second subset, denoted V-C-DAI/V-T-DAI.

Figure 7:
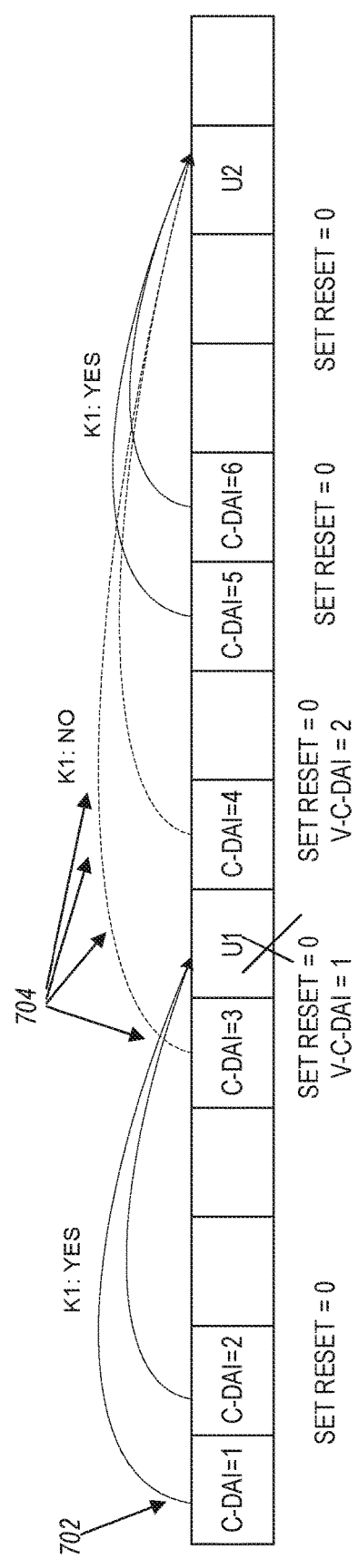

In the above mentioned one or more DCIs, the gNB could set a special value of K1, i.e. no valid PDSCH-to-HARQ-ACK-timing indicated so that ARI and/or TPC can be reinterpreted to indicate V-C-DAI/V-T-DAI. As shown in FIG. 7 or FIG. 8, the first two PDSCHs of sets 704/804 are next to PUCCH UI, and the gNB cannot prepare scheduling information in these two DCIs considering HARQ-ACK information carried in UI due to the insufficient processing time. In these two DCIs, C-DAI=3 & 4 are indicated following the two green PDSCHs with C-DAI=1 & 2. Additionally, V-C-DAI=1 & 2 are indicated in DCI, where ARI or TPC fields are not needed so that V-C-DAI can be indicated instead of AIR or TPC without changing the total number of bits for DCI. The reset indicator is unchanged (i.e. value 0, not toggled). Starting from the 3rd PDSCH in sets 704/804, the gNB could know the reception status of UI due to the sufficient processing time for UI decoding. The interpretation as C-DAI or V-C-DAI for the DCIs scheduling the last two PDSCHs in sets 704/804 depends on whether the reset indicator is toggled or not.

In FIG. 7, UI is not received and the gNB could trigger the UE to report HARQ-ACK for PDSCH with C-DAI=1 & 2 again. In this regard, the gNB keeps the same value of reset indicator (i.e. value 0, not toggled) and indicates C-DAI=5 & 6 (1 & 2 after modulo operation) in the DCIs scheduling 3rd and 4th blue PDSCHs, which counts all PDSCHs in the two subsets. To report HARQ-ACK, the UE can include HARQ-ACKs for all 6 PDSCHs by following the C-DAI indication.

Figure 10:
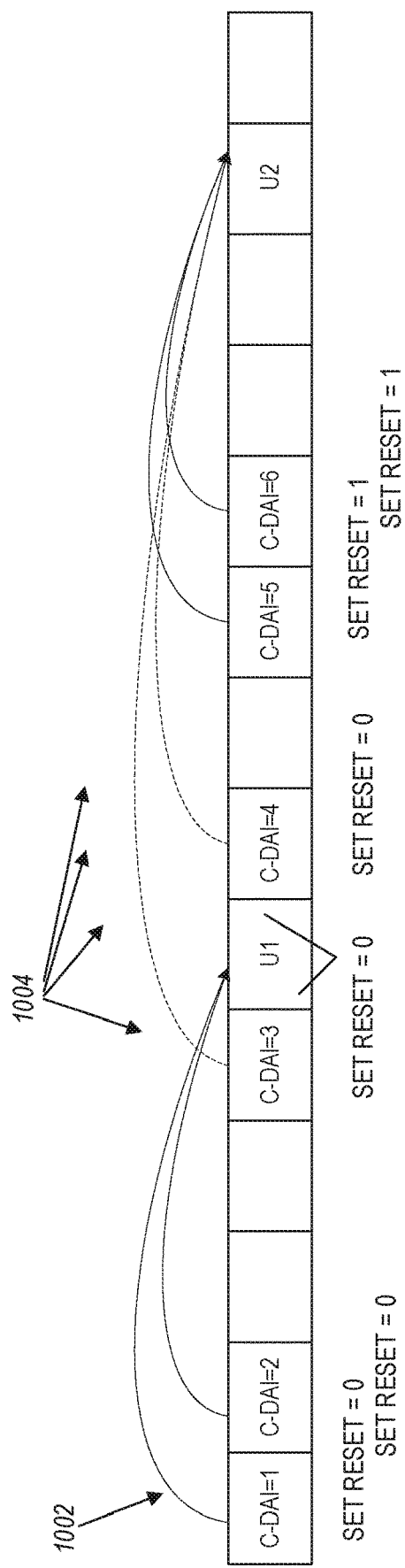

In FIG. 10, UI is received, UE does not need to report HARQ-ACK for PDSCH with C-DAI=1 & 2 anymore, so gNB could toggle reset indicator (i.e. value 1) and indicate V-C-DAI=3 & 4 in the DCIs scheduling 3rd and 4th blue PDSCHs, which only counts PDSCHs in the current subset. To report HARQ-ACK, UE can include HARQ-ACKs for the 4 blue PDSCHs by following V-C-DAI indication of the blue PDSCHs.

In one embodiment, for the above consecutive subsets, C-DAI/T-DAI counts the number of PDSCHs in all the above consecutive subsets. If the reset indicator in the DCIs in the second subset other than the above mentioned one or more DCIs is toggled, UE could implicitly adjust the value of C-DAI in the DCIs in the second subset based on the number of PDSCHs in the first subset(s) and use the adjusted C-DAI for determining HARQ codebook.

For example, as shown in FIG. 9 or FIG. 10, the first two PDSCHs in set 904/1004 are near to PUCCH UI. The gNB cannot prepare scheduling information in these two DCIs considering HARQ-ACK information carried in UI. In these two DCIs, C-DAI=3 & 4 are indicated which count the two earlier PDSCHs with C-DAI=1 & 2. The reset indicator is unchanged (i.e. value 0, not toggled). Starting from the 3rd PDSCH in sets 904/1004, the gNB could know the reception status of UI. The DCIs scheduling the last 2 PDSCHs 904/1004 have C-DAI=5 & 6.

In FIG. 9, if UI is not correctly received, the gNB could trigger the UE to report HARQ-ACK for PDSCH with C-DAI=1 & 2 again. The gNB keeps the same value of a reset indicator (i.e. value 0, not toggled) in DCI scheduling blue PDSCHs with C-DAI=5 & 6. The UE may transmit HARQ-ACK of all 6 PDSCHs by C-DAI and does HARQ-ACK transmission on U2.

In FIG. 10, if the UI is correctly received, the UE does not need to report HARQ-ACK for PDSCH with C-DAI=1 & 2 anymore. Therefore, the gNB could toggle the reset indicator (i.e. value 1) in the DCI scheduling last two PDSCHs in set 1004. Since the reset indicator is toggled, the UE could assume that HARQ-ACKs for the first subset have been correctly received by the gNB. Then, the UE could know the first PDSCH in the second subset has a C-DAI=3. Finally, the UE can know there are four PDSCHs in the second subset of 1004 ordered by C-DAI=3,4,5,6. In this case, the UE can just report 4 HARQ-ACKs for the second subset 1004 in U2 even though the last C-DAI value is 6.

In one embodiment, for the above consecutive subsets, C-DAI/T-DAI in the above mentioned one or more DCIs count the number of PDSCHs in all the above consecutive subsets. If the reset indicator in the other DCIs in the second subset is not toggled, C-DAI/T-DAI in the DCIs counts the number of PDSCHs in all the above consecutive subsets. If the reset indicator in the other DCIs in the second subset is toggled, C-DAI/T-DAI in the DCIs only counts the number of PDSCHs in the second subset. If the reset indicator in the other DCIs in the second subset is toggled, the HE could adjust the value of C-DAI in the above mentioned one or more DCIs based on the number of PDSCHs in the first subset(s).

Figure 11:
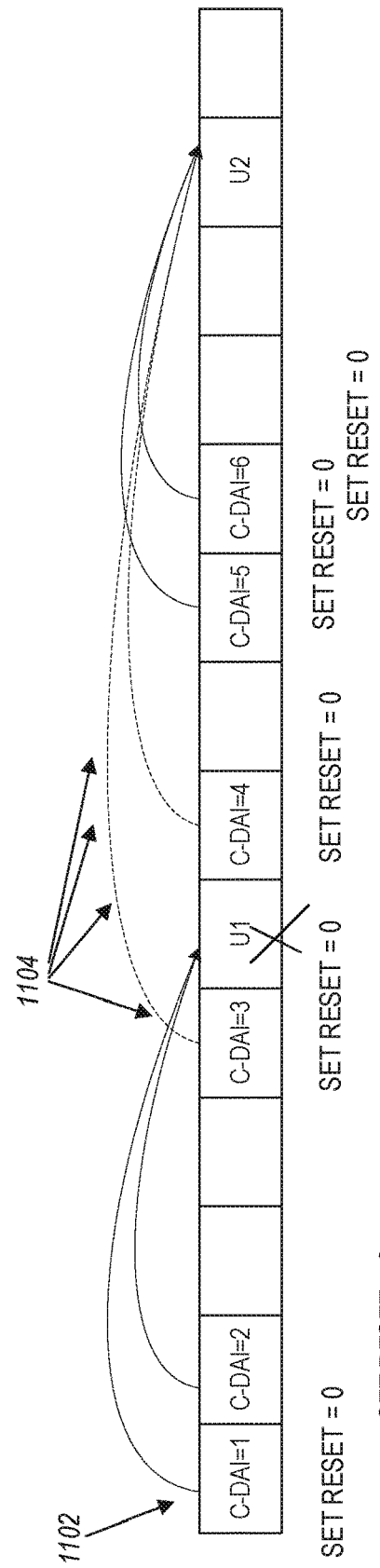
Figure 12:
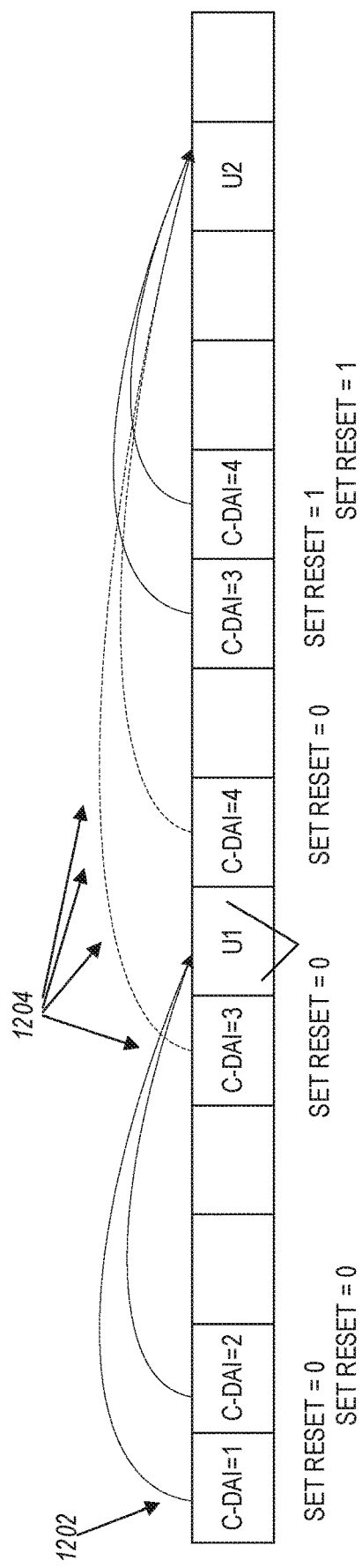

As shown in FIG. 11 or FIG. 12, the first two PDSCHs in sets 1104/1204 are near to PUCCH U1. The gNB cannot prepare scheduling information in these two DCIs referring to HARQ-ACK information carried in UI. In these two DCIS, C-DAI=3 & 4 are indicated which count the two earlier PDSCHs with C-DAI=1 & 2. The reset indicator is unchanged (i.e. value 0, not toggled). Starting from the 3rd PDSCH in sets 1104/1204, the gNB could know the reception status of UL The values of C-DAI in the DCIs scheduling the last two PDSCHs in sets 1104/1204 depend on the reset indicator.

In FIG. 11, UI is not correctly received. The gNB could trigger UE to report HARQ-ACK for PDSCH with C-DAI=1 & 2 again. The gNB keeps the same value of a reset indicator (i.e. value 0, not toggled) in DCI scheduling the last two PDSCHs in set 1104, which are assigned with C-DAI=5 & 6. The UE transmits HARQ-ACK of all 6 PDSCHs by C-DAI and does HARQ-ACK transmission on U2.

In FIG. 12, UI is correctly received. The UE does not need to report HARQ-ACK for PDSCH with C-DAI=1 & 2 anymore, so the gNB could toggle reset indicator (i.e. value 1) in the DCI scheduling last two PDSCHs in set 1204. The last two PDSCHs in set 1204 have C-DAI=3 & 4. Since the reset indicator is toggled, the UE could determine that the HARQ-ACKs for the first subset have been correctly received by the gNB. Then, the UE could interpret the C-DAI of the first two PDSCHs in set 1204 by 2, so that new C-DAI values become 1 & 2. The C-DAI of the 4 PDSCHs in set 1204 become 1, 2, 3, 4. In this way, the LTE could transmit the HARQ-ACK of the four PDSCHs in set 1204 by C-DAI.

In one embodiment, a single set of PDSCH is used in HARQ-ACK transmission. Therefore, the HARQ-ACK codebook is determined by a reset indicator, C-DAI/T-DAI. In this case, information on a set index is not needed in a DCI. For example, the scheme shown in FIG. 7-FIG. 12 could operate if only one set of PDSCH is used in HARQ-ACK transmission. Equivalently, the concept of a set of PDSCH may not need to be defined.

Semi-Static HARQ-ACK Transmission Based on HARQ Processes

In a semi-static HARQ-ACK codebook, one way to make a fixed codebook size is to transmit HARQ-ACK for all configured HARQ processes or a subset of configured HARQ processes. In this scheme, HARQ-ACK bits for an already transmitted HARQ process in a previous HARQ-ACK transmission are still included in the current HARQ-ACK codebook. An important aspect is to make the gNB and the LTE have the same understanding of the transmitted HARQ-ACK bits for a HARQ process.

The triggering DCI may schedule a PDSCH or only trigger HARQ-ACK transmission of earlier scheduled PDSCHs. For a first HARQ process used by a PDSCH received by the UE, if HARQ-ACK of the PDSCH is to be reported on the current HARQ-ACK transmission for the first time HARQ-ACK feedback, the HARQ-ACK for the first HARQ process is generated according to the reception status of the PDSCH. Otherwise, the HARQ-ACK for the latest PDSCH of a second HARQ process received by UE is expected to be already transmitted in a previous HARQ-ACK transmission for the first time HARQ-ACK feedback. This could happen if UE receives a trigger DCI which schedules a PDSCH with a different HARQ process or only trigger HARQ-ACK transmission. There are 4 cases for the second HARQ process:

Case 1): for the HARQ process, the UE already sent a HARQ-ACK and the gNB correctly received the HARQ-ACK;

Case 2): for the HARQ process, the UE sends its HARQ-ACK, but gNB fails to receive this HARQ-ACK;

Case 3): for the HARQ process, the UE fails to pass LBT, hence it cannot transmit PUCCH carrying the HARQ-ACK;

Case 4): for the HARQ process, the UE misses DCI with a toggled NDI, hence UE never transmits a PUCCH indicated by the DCI since UE does not know there is a new PDSCH scheduled by gNB.

Without other enhancements, a UE may not be able to distinguish case 4) from case 1). In one embodiment, once the UE already sends the ACK for a HARQ process in a previous PUCCH, the UE may report non-acknowledgment or discontinuous transmission (NACK/DTX) for the same HARQ process if no new PDSCH received for the HARQ-ACK process and there is new PUCCH for HARQ-ACK transmission. In this way, the UE may report NACK/DTX for case 1) and 4), though UE cannot distinguish case 1) and 4). After receiving the NACK/DTX, if it is case 4), the gNB can schedule retransmission for the PDSCH. Such a scheme works, however, the UE may also report NACK/DTX in case 2), which may cause redundant retransmission of a PDSCH.

Figure 13:
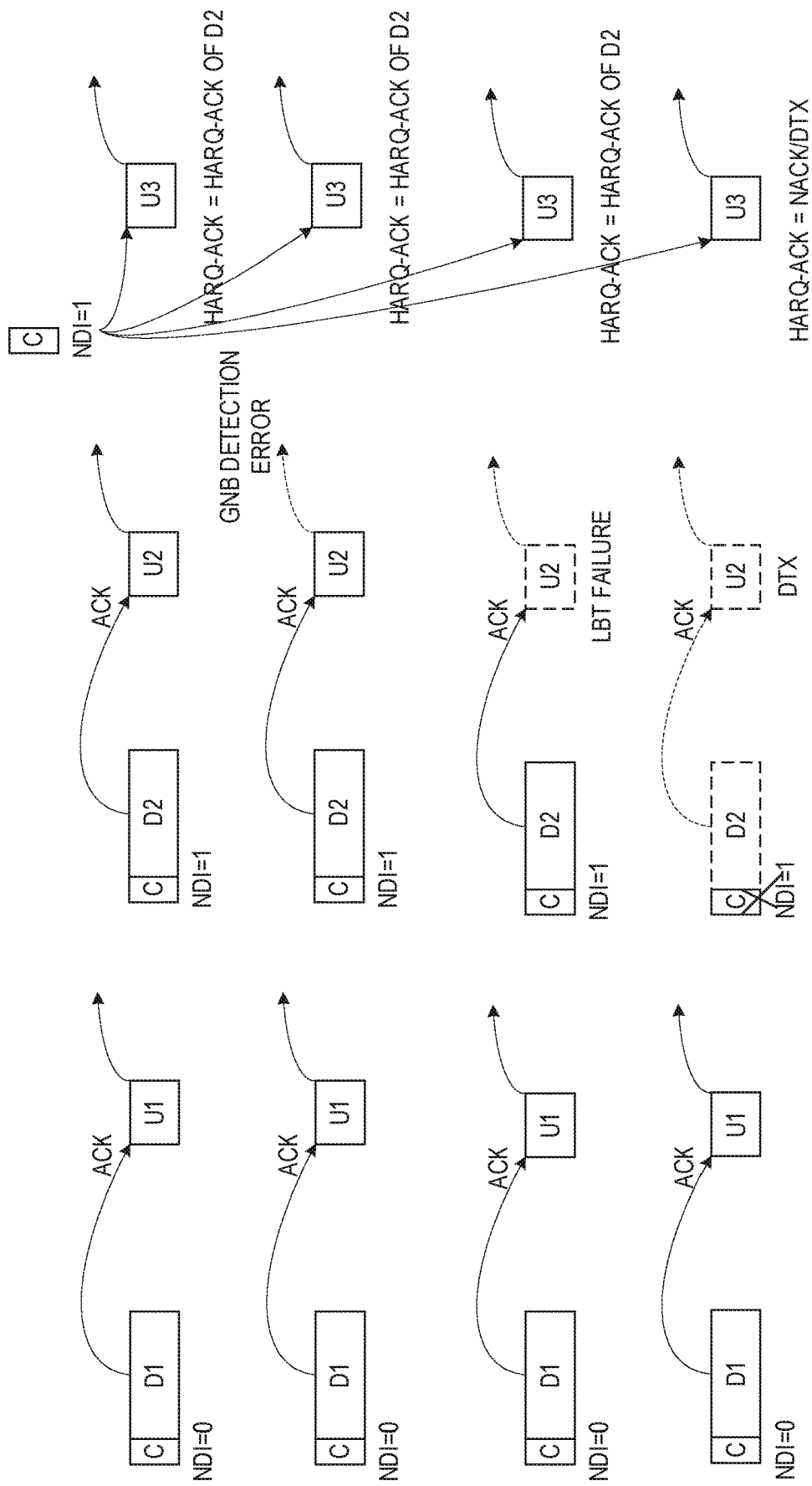
FIG. 13 illustrates aspects for HARQ-ACK status of a HARQ process, in accordance with some aspects.

FIG. 13 illustrates aspects for HARQ-ACK status of a HARQ process, in accordance with some aspects. In one embodiment, the triggering DCI may schedule a PDSCH or only trigger HARQ-ACK transmission. The DCI could include the latest value of NDI for a HARQ process if HARQ-ACK for the HARQ process is not correctly received; otherwise, it can include a toggled NDI for the HARQ process. For case 1) in FIG. 13, given the gNB is certain that there is no confusion on PDSCH transmission using this HARQ process between UE and gNB, the gNB could indicate either values of NDI in the triggering DCI. Based on the NDI value, the UE can know whether there is a missed PDCCH for the HARQ process. In an extreme case, 16 or 32 bits of NDI values are needed to trigger HARQ-ACK for all 16 HARQ processes with one or two TBs. For example, as shown in FIG. 13, when the gNB signals NDI=1 for a HARQ process in the most recent DCI trigging HARQ-ACK transmission in PUCCH resource U3, the UE can distinguish case 1)-4) by comparing the latest NDI known by the UE and the NDI (=1) signaled in the most recent DCI for a HARQ process.

The UE may transmit the actual HARQ-ACK for the HARQ process in the current HARQ-ACK codebook if NDI is not toggled. It is case 1), 2) or 3). For case 1) or 2), though they are still not distinguishable by the UE, the UE can always transmit the actual HARQ-ACK (ACK in FIG. 13) of PDSCH D2 again to gNB so that gNB can know the D2 is correctly received; for case 3), the UE can transmit the actual HARQ-ACK (ACK in FIG. 13) of D2 to gNB since it is never transmitted yet.

The UE reports NACK/DTX for the HARQ process in the current HARQ-ACK codebook if NDI is toggled. It is case 4). The UE eventually realizes it must miss a PDCCH with NDI=1 scheduling D2, therefore the UE can report NACK/DTX.

In one embodiment, when the UE reports its HARQ-ACK to the gNB in a PUCCH, the UE can include the lastest NDI at the UE side for each HARQ process. In an extreme case, 16 or 32 bits of the latest NDI are included in the HARQ-ACK codebook for all 16 HARQ processes with one for two TBs. The gNB can identify case 1)-4) by comparing HE reported latest NDI in PUCCH U3 and the NDI (=1) known by gNB for a HARQ process.

It is case 1), 2) or 3) if NDI is not toggled. For case 1), it is duplicated HARQ-ACK information for the HARQ process in gNB point of view; for case 2) and 3), sometimes the gNB cannot correctly distinguish these two cases, however, gNB could get the correct HARQ-ACK information (ACK in FIG. 4) for the HARQ process;

It is case 4) if NDI is toggled. gNB could know that UE must miss the PDCCH with NDI=1 scheduling PDSCH D2, therefore gNB can consider a DTX is received for D2.

In one embodiment, the triggering DCI may schedule a PDSCH or only trigger the HARQ-ACK transmission, the DCI could include one-bit information, denoted as PUCCH_NDI. The PUCCH_NDI could operate in a toggled/not toggled manner. The PUCCH_NDI. could indicate whether UE needs to report HARQ-ACK in the current PUCCH for the latest PDSCH of a HARQ process whose HARQ-ACK is expected to be transmitted in a previous PUCCH for the first time HARQ-ACK feedback. Alternatively, the PUCCH_NDI could indicate if a previous PUCCH carrying HARQ-ACK is correctly received by gNB. The scheme can operate on all HARQ processes as a whole or can operate on each subset of HARQ processes separately. Preferably, if a PUCCH is correctly received, gNB can trigger new HARQ-ACK transmission with PUCCH_NDI toggled; If PUCCH is wrong or not detected, gNB triggers HARQ-ACK retransmission with PUCCH_NDI not toggled. For a HARQ process whose HARQ-ACK is expected to be already transmitted in a previous PUCCH, UE reports a NACK/DTX for the HARQ process in the current HARQ-ACK. codebook if UE receives PUCCH_NDI toggled. It is 1) or 4). The UE may not be able to distinguish case 1) and 4) for the HARQ process, but UE can always report a NACK/DTX;

If the HE receives PUCCH_NDI not toggled, the UE reports the actual HARQ-ACK for the HARQ process in the current HARQ-ACK codebook. If the UE already transmits the previous PUCCH, it is case 2). The UE is aware that the gNB does not receive its transmitted PUCCH, therefore the UE reports the actual HARQ-ACK. (ACK in FIG. 13) again. If the UE does not transmit the previous PUCCH, it is case 3). The UE reports the actual HARQ-ACK (ACK in FIG. 13).

FIG. 14 and FIG. 15 illustrate the uses of PUCCH_NDI, in accordance with some aspects. As shown in FIG. 14, the number in term P{number} means the HARQ process number. Since PUCCH_NDI when scheduling HARQ process 4 & 7 is toggled (0 versus 1), the UE can report NACK/DTX for HARQ process 0 & 1 and include actual HARQ-ACK for HARQ process 4 & 7. If the UE misses a second PDSCH with HARQ process 1, though the UE does not know its existence, the UE anyway reports to NACK/DTX for HARQ process 1 in PUCCH U2. On the other hand, as shown in FIG. 15, if PUCCH_NDI is not toggled, the UE can report actual HARQ-ACK for all 4 HARQ processes.

In one embodiment, the above scheme based on PUCCH_NDI can operate on a set of PDSCHs identified with the same set index. The set index can be indicated in DCI. A different set of PDSCHs can be interleaved in time. PUCCH_NDI in DCI for PDSCHs with a different set index operates independently.

In one embodiment, a subset of HARQ processes is predefined, preconfigured or configured by RRC, so that the UE only reports HARQ-ACK for a subset of HARQ processes to reduce payload size for UCI on PUCCH. A single subset of HARQ processes could be predefined, preconfigured or configured by RRC. Alternatively, multiple subsets of HARQ processes could. be predefined, preconfigured or configured by RRC. The subset of the HARQ process is explicitly indicated in the triggering DCI. Alternatively, the HARQ processes indicated in the triggering DCI implicitly indicate a subset of the HARQ process, e.g. this subset contains the HARQ process in the DCI.

In one embodiment, a subset of a set of PDSCHs using a set of HARQ processes could include the PDSCHs whose HARQ-ACKs are expected to transmit on the same PUCCH resource for the first time HARQ-ACK feedback. For consecutive subsets, if there is no enough gNB processing time between a PUCCH resource for the first subset(s) and one or more DCIs scheduling PDSCHs in the second subset, gNB could keep PUCCH_NDI unchanged in the above mentioned one or more DCIs. Alternatively, the gNB and the UE may just neglect the value of the PUCCH_NDI in the above mentioned one or more DCIs. The first subset(s) may be strictly a single subset of the set of PDSCHs using the set of HARQ processes, or the first subset(s) could be actually multiple consecutive subsets having the same PUCCH_NDI. The PUCCH_NDI in the above one or more DCIs could be different from PUCCH_NDI in the other DCIs of the second subset. The PUCCH_NDI in the other DCIs of the second subset is used to determine the HARQ-ACK transmission of all HARQ processes in the second subset. If no DCI in the 2nd subset other than the above mentioned one or more DCIs is received, the PUCCH_NDI in the above mentioned one or more DCIs could be used to determine HARQ-ACK transmission of the second subset. Alternatively, the PUCCH_NDI in a later DCI using the set of HARQ processes is used to derive effective PUCCH_NDI of the second subset.

In the above mentioned one or more DCIs, the gNB could indicate a valid value of PDSCH-to-HARQ-ACK-timing. If a DCI other than the above mentioned one or more DCIs is received by the UE, the UE could rely on PUCCH_NDI in the DCI regarding how to treat HARQ-ACK of HARQ processes used by the first subset(s). Otherwise, the UE could report NACK/DTX for the HARQ processes used by the first subset(s), or the UE could report actual HARQ-ACK for the HARQ processes used by the first subset(s). Alternatively, in the above mentioned one or more DCIs, the gNB could set a special value of K1, i.e. no valid PDSCH-to-HARQ-ACK-timing indicated. If the UE does not receive any other DCI except the above mentioned one or more DCI, there is no valid PDSCH-to-HARQ-ACK-timing to derive a PUCCH resource. The HARQ-ACK retransmission relies on future gNB scheduling. Since the UE does not transmit PUCCH carrying HARQ-ACK for the PDSCHs without valid PDSCH-to-HARQ-ACK-timing, an additional DCI may trigger HARQ-ACK retransmission by scheduling the same set of HARQ processes at a later time. That is, the PUCCH_NDI of the later DCI equals to the PUCCH_NDI of the second subset, and also determine whether to retransmit HARQ-ACK for HARQ processes used by the first subset(s).

Figure 17:
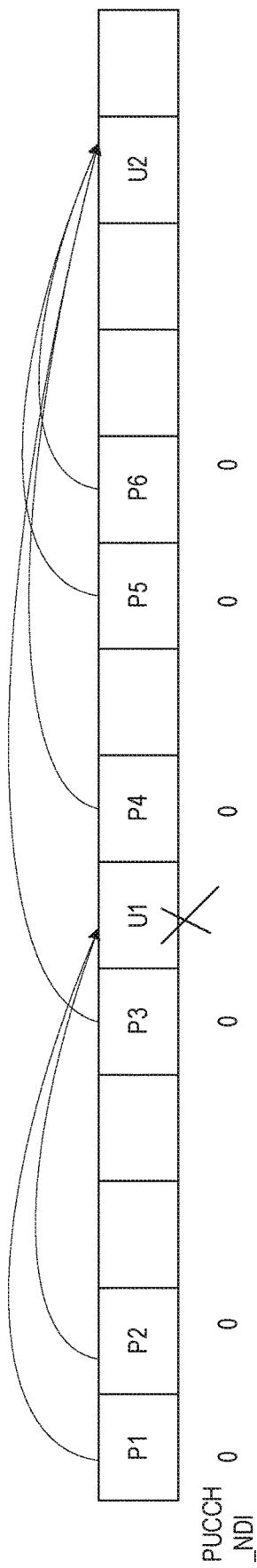

FIG. 16 and FIG. 17 illustrate HARQ-ACK transmissions for a set of PDSCHs, in accordance with some aspects. As shown in FIG. 16, since PUCCH_NDI when scheduling HARQ process 5 & 6 is toggled (0 versus 1), the UE can report NACK/DTX for HARQ process 1 & 2 and include actual HARQ-ACK for HARQ process 3-6. On the other hand, as shown in FIG. 17, if the PUCCH_NDI is not toggled for DCI scheduling HARQ process 5 & 6, the UE can report actual HARQ-ACK for all HARQ processes 1-6.

In one embodiment, a subset of HARQ processes is predefined, preconfigured or configured by RRC. In a DCI scheduling a PDSCH, a second HARQ process number is indicated in addition to the HARQ process number used in HARQ soft combining. The second HARQ process number is used in forming a HARQ-ACK codebook. The second HARQ process number can be a separate field, hence, it can be carried in all DCI. Alternatively, the second HARQ process number is only included in some of the DCIs. For example, for a DCI without valid. PDSCH-to-HARQ-ACK timing, ARI and TPC field is actually useless, and these five bits can be reinterpreted to indicate the second HARQ process number; while for a DCI with valid PDSCH-to-HARQ-ACK timing, the second HARQ process number is not indicated. In this way, though there is a restriction on the gNB's using a HARQ process, e.g. limited by early (re) transmission status, the gNB could transform current used HARQ processes into a subset by setting a proper second HARQ process number, so as to compact HARQ-ACK payload size. In this scheme, the gNB cannot manage the HARQ process in the DCI used to indicate PDSCH-to-HARQ-ACK timing, PUCCH resource and TPC. However, the gNB can always manage the HARQ process in a DCI without valid PDSCH-to-HARQ-ACK timing.

Figure 18:
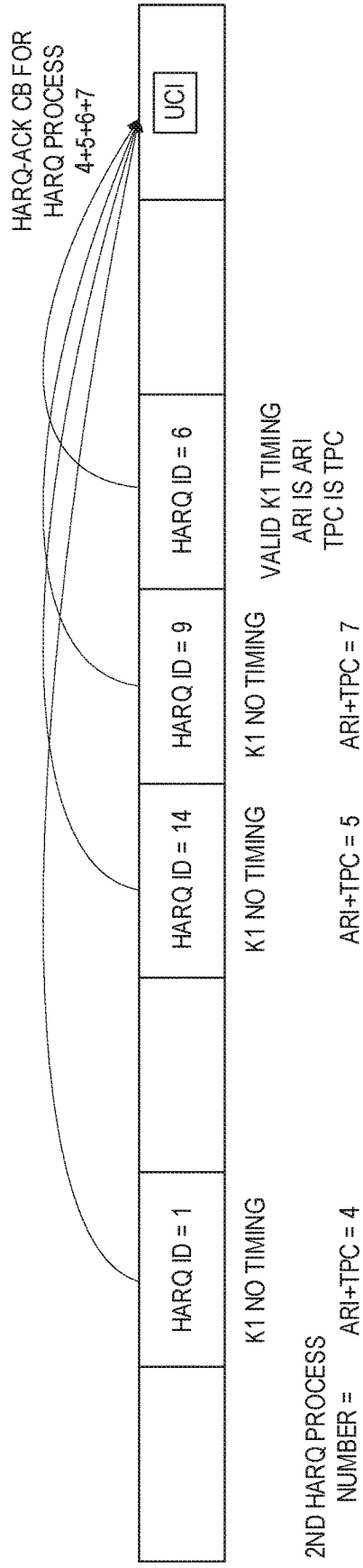
FIG. 18 illustrates using a second HARQ process number to form a HARQ-ACK codebook, in accordance with some aspects.

FIG. 18 illustrates using a second HARQ process number to form a HARQ-ACK codebook, in accordance with some aspects. Assuming a maximum of 16 HARQ processes are configured, which is divided into 4 subsets, 0~3, 4~7, 8~11, 12~15, a HARQ-ACK feedback per subset is transmitted as one PUCCH. As shown in FIG. 18, assuming the gNB has to schedule HARQ process 1, 14, 9, 6 for HARQ soft combining, assuming the gNB wants to pretend subset 4~7. The PDSCH scheduled by DCI with HARQ process number=6 is the one with valid K1, hence number 6 cannot be changed. in fact, there is no other field in DCI that can be used to change it to a different HARQ process number. For PDSCH scheduled by DCI with HARQ process number field=1, 14, 9, a second HARQ process number 4, 5, 7 is indicated respectively by reusing AM & TPC. Finally, a 4-bit HARQ-ACK codebook is formed for HARQ process numbers 4, 5, 6 and 7.

In one embodiment, a field in DCI is to trigger HARQ-ACK transmission for a subset of HARQ processes or all HARQ processes. If it is per subset HARQ-ACK transmission, it can further indicate the subset triggered. For example, as shown in Table 1, assuming 2 hit is used as the trigger, one option is to indicate HARQ-ACK transmission for 16 HARQ processes, HARQ processes 0-7 and HARQ processes 8-15. The remaining code point could indicate HARQ-ACK transmission for HARQ processes 0-3. Another option is to indicate HARQ-ACK transmission for 16 HARQ processes, HARQ processes 0-7, HARQ processes 0-5 and HARQ processes 0-3, assuming the HARQ process number can be managed to form a HARQ-ACK codebook, e.g. relying on second HARQ process number as proposed in the above embodiment.

TABLE 1

| Trigger for a subset or full set of HARQ-ACK feedback | | |
|---|---|---|
| code point | option 1 | option 2 |
| 00 | 0-15 | 0-15 |
| 01 | 0-7 | 0-7 |
| 10 | 8-15 | 0-5 |
| 11 | 0-3 | 0-3 |

Semi-Static HARQ-ACK Transmission Based on Configured PDSCH-to-HARQ-ACK Timings

Semi-static HARQ-ACK codebook may be formed based on configured PDSCH-to-HARQ-ACK timings, i.e., the number of HARQ-ACK is the same as the possible candidates of PDSCH-to-HARQ-ACK timings, which can be configured by RRC. The semi-static UL-DL-configurations for TDD is used to further reduce the codebook size. In NR-U, it is likely that some DCI scheduling a PDSCH may not include valid PDSCH-to-HARQ-ACK timing, which impacts the semi-static HARQ-ACK codebook.

FIG. 19 illustrates a semi-static HARQ-ACK codebook considering PDSCHs without PDSCH-to-HARQ-ACK timings, in accordance with some aspects. In one embodiment, to account for DCI without valid PDSCH-to-HARQ-ACK timing, the HARQ-ACK bits for X slots are always added to the HARQ-ACK codebook derived by valid PDSCH-to-HARQ-ACK timings. X can be configured by RRC, determined based on UE capability, or fixed in the specification. For example, the interval of X slots should be equal to or larger than UE processing time for PDSCH reception, so that UE has time to get HARQ-ACK for all possible PDSCHs located in the ending slots of a previous channel occupation time (COT) in the worst case. The HARQ-ACK for the above X slots can be sorted in time, alternatively, the C-DAI field can be used to order the HARQ-ACK for the PDSCH in the X slots. For example, for a DCI without valid PDSCH-to-HARQ-ACK timing, ARI and TPC field is actually useless, and these bits can be reinterpreted to indicate C-DAI so that it doesn't increase the DCI size. As shown in FIG. 19, the HARQ-ACKs for 3 slots are added to 5-bit HARQ-ACK codebook derived by valid PDSCH-to-HARQ-ACK timings.

In one embodiment, the slot format indicator (SFI) signaled by DCI format 2_0 can be used to reduce the codebook size. For a SLIV conflicted with the 'U' symbol in SFI, no HARQ-ACK is allocated. In one embodiment, if DL or UL BWP switching happens, HARQ-ACK of impacted PDSCH can be removed from the semi-static HARQ-ACK codebook. In one embodiment, for a slot outside gNB-initiated COT, no HARQ-ACK is allocated.

Increased Opportunities for HARQ-ACK Transmission

A DCI may schedule a PDSCH or only trigger HARQ-ACK transmission. The DCI may indicate the PUCCH resources used for HARQ-ACK transmission. The DCI could indicate an LBT type used for starting PUCCH transmission. If the indicated PUCCH is inside a COT, one-shot LBT, e.g. 25 us CCA could be used by the UE to start a PUCCH transmission. If the indicated PUCCH is immediately following a DL transmission within NS us, e.g. NS equals to 16, the UE could transmit the PUCCH without doing LBT, denoted as LBT CAT-1. If the indicated PUCCH is outside a COT, CAT-4 LBT has to be used by UE to start PUCCH transmission. The DCI could indicate one from the three LBT types used for starting PUCCH transmission, i.e. 2 bits could be signaled in the DCI. Alternatively, the UE derives the LBT type to start PUCCH transmission by the DCI and COT sharing information, e.g. slot format information (SFI) by DCI 2_0. To check a PUCCH is within a COT or not, if an 'F' symbol indicated by SFI may mean a period not belonging to the COT, condition for the check is that the PUCCH is overlapped with at least one symbol indicated as 'U' symbol by SFI. Alternatively, a PUCCH overlapped with either 'F' symbol and/or 'U' symbol by SFI is considered within a COT.

In one embodiment, the DCI could indicate 1-bit information on whether CAT-1 LBT is used. If the 1-bit information indicates the use of CAT-1 LBT, UE uses CAT-1 LBT to start PUCCH transmission. If not, the UE checks COT sharing information. If the indicated PUCCH is within a COT, the UE uses CAT-2 LBT to start PUCCH transmission; otherwise, a CAT-4 LBT is used.

In one embodiment, the DCI could indicate 1-bit information to differentiate CAT-1 LBT and CAT-4 LBT. If the 1-bit information indicates the use of CAT-1 LBT, UE uses CAT-1 LBT to start PUCCH transmission. If the 1-bit information indicates the use of CAT-4 LBT, the UE checks COT sharing information and derives an LBT type.

In one embodiment, if CAT-4 LBT is indicated by the DCI, the to UE checks COT sharing information and derives an LBT type to start PUCCH transmission. If the indicated PUCCH is within a COT, the UE changes LBT to CAT-2 LBT to start PUCCH transmission; otherwise, CAT-4 LBT is used. The gNB could indicate the boundary of CAT-1 LBT, e.g. by DCI 2_0 together with the indication of slot format. For example, the boundary could be the start of a symbol. Alternatively, the boundary could be NS us after the start of a symbol. In this case, if the indicated PUCCH start right from the boundary, the UE changes LBT to CAT-1 LBT to start PUCCH transmission; if the indicated PUCCH is within a COT but not start from the boundary, the LTE changes LBT to CAT-2 LBT to start PUCCH transmission; otherwise, CAT-4 LBT is used. In one embodiment, if CAT-2 LBT is indicated by the DCI, and if the indicated PUCCH starts right from the boundary, the UE changes LBT to CAT-1 LBT to start PUCCH transmission; otherwise, CAT-2 LBT is used.

In one embodiment, there exist multiple DL to UL and UL to DL switching points. Multiple DCI 2_0 could be transmitted to indicate the slot formats. A DCI 2_0 could only indicate one boundary for CAT-1 LBT. Preferably, a DCI 2_0 only indicates the first boundary for CAT-1 LBT at least Nb symbols after the DCI 2_0. Nb is to account for UE processing time, propagation delay and etc. Nb is predefined or configured by RRC signaling. The boundary could be indicated as an offset from the timing of the DCI The boundary could be indicated as an offset from the first 'F' symbol after the DCI 2_0. The boundary could be indicated as an offset from the first 'F' or 'U' symbol after the DCI 2_0. The boundary could be indicated as an offset from the first 'F' symbol LBT at least Nb symbols after the DCI 2_0. The boundary could be indicated as an offset from the first 'F' or 'U' symbol LBT at least Nb symbols after the DCI 2_0.

FIG. 20 illustrates different LBT types for multiple K1 values, in accordance with some aspects. To provide more opportunities for PUCCH for the mitigation of LBT failure, a DCI could indicate multiple values of K1 for PDSCH-to-HARQ-ACK timings, so that multiple PUCCH resources for HARQ-ACK transmission can be indicated by the DCI. In one embodiment, the same LBT types apply to all PUCCHs corresponding to the multiple values of K1. In one embodiment, UE needs to individually derive the LBT type that applies to each PUCCH. corresponding to the multiple values of K1. As shown in FIG. 20, the first PUCCH of the two PUCCHs indicated by the DCI is within a COT and use CAT-2 LBT. While the second PUCCH of the two PUCCHs indicated by the DCI is outside the COT and use CAT-4 LBT.

Group Triggering HARQ-ACK Transmission and Retransmission

The HARQ-ACK for a PDSCH scheduled in a COT may no be able to transmit in the same COT. As shown in FIG. 12, this is caused by the limitation of UE processing time and/or propagation delay, etc. In this case, CAT-4 LBT could be used to start the PUCCH transmission carrying HARQ-ACK. However, it is a general understanding that CAT-4 LBT may fail right before the PUCCH resource due to channel contention from other devices. Methods to increase the probability of PUCCH transmission could be considered.

FIG. 21 illustrates a cat for LBT used in outside COT, in accordance with some aspects. In one embodiment, if the indicated PUCCH is inside a COT, the DCI only indicates a single value of K1 for PDSCH-to-HARQ-ACK timing, i.e. a single PUCCH is indicated. Otherwise, the DCI could indicate multiple values of K1 for PDSCH-to-HARQ-ACK timings, i.e. multiple PUCCHs are indicated with CAT-4, which increases the channel access opportunities.

To provide more opportunities of PUCCH for the mitigation of LBT failure, if the gNB could initiate a second COT before the previously indicated PUCCH (U2 in FIG. 21) using CAT-4 LBT and share the second COT to UE, UE could change LBT type of U2 from CAT-4 to CAT-1 or CAT-2. In one embodiment, if the indicated PUCCH is within the 2nd COT, UE changes LBT to CAT-2 LBT to start PUCCH transmission; otherwise, CAT-4 LBT is used. In one embodiment, if the indicated PUCCH start right from the boundary of CAT-1 LBT, UE changes LBT to CAT-1 LBT to start PUCCH transmission; if the indicated PUCCH is within a COT but not start from the boundary, the UE changes LBT to CAT-2 LBT to start PUCCH transmission; otherwise, CAT-4 LBT is used.

In some aspects, when the gNB initiates a second COT, there is no enough time to share COT to a previous indicated PUCCH. Further, when the gNB initiates a second COT, it is possible that the start timing of the second COT is even after the previous indicated PUCCH. In the slot carrying the previous indicated PUCCH, typically multiple PUCCHs for HARQ-ACK transmissions of different UEs are multiplexed in the slot. Due to the contention of other devices, it is possible one or multiple UEs fail in CAT-4 LBT hence the PUCCHs are dropped. To save overhead in triggering HARQ-ACK retransmission, it is beneficial that the gNB could trigger the above one or multiple UEs failed in LBT for PUCCH by a group-triggering DCI (GT-DCI). DT-DCI could be DCI 2_0 which indicates slot formats and acts as a group trigger. GT-DCI could be another DCI just acting as a group trigger. The same PUCCH frequency resource as the previous indicated PUCCH for a UE could still be allocated to the UE. One issue is to determine the time resource of the new PUCCH.

In one embodiment, a time offset is indicated by the GT-DCI. For a group of UEs fail in PUCCH transmission with CAT-4 LBT derived by the previous indicated PDSCH-to-HARQ-timing K1, the timing of the new PUCCH is then derived by K1 and the time offset $\Delta$. For example, the slot timing of the new PUCCH is K1+$\Delta$. If the new PUCCH resource in slot K1+$\Delta$ is overlapped with the 'F' symbol and/or 'U' symbol by SFI, the UE may transmit the PUCCH. One special value of the offset field could be used to indicate that grouping triggering is disabled. For the group of UEs, CAT-2 LBT could be used to start new PUCCH transmissions. Alternatively, assuming DCI 2_0 of the 2nd COT indicates the boundary of CAT-1 LBT, for the group of UEs, if the indicated PUCCH of a UE starts right from the boundary of CAT-1 LBT, the UE changes LBT to CAT-1 LBT to start PUCCH transmission; otherwise, CAT-2 LBT is used.

Figure 22:
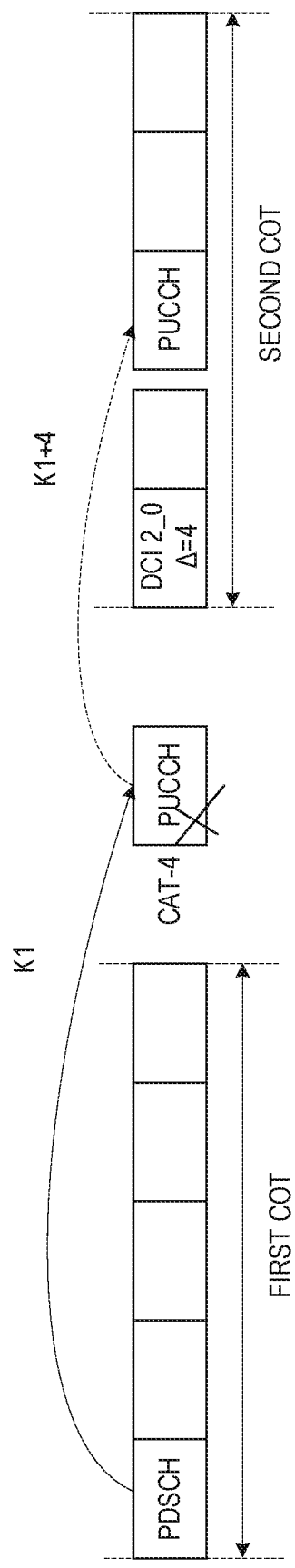
FIG. 22 and FIG. 23 illustrate group triggering HARQ-ACK retransmission, in accordance with some aspects.
Figure 23:
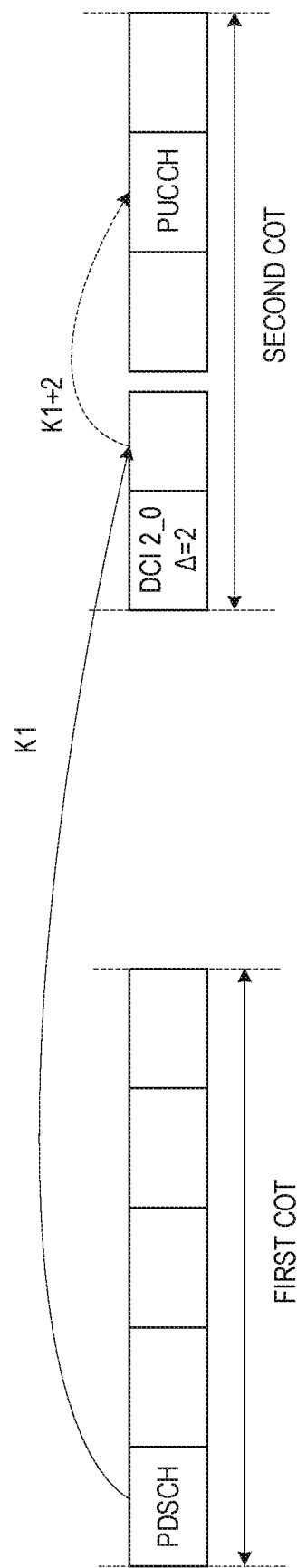

FIG. 22 and FIG. 23 illustrate group triggering HARQ-ACK retransmission, in accordance with some aspects. As shown in FIG. 22, a UE is allocated a previous PUCCH resource following PDSCH-to-HARQ-timing K1 but fails in PUCCH transmission. After receiving DCI 2_0 in the 2nd COT which indicates an offset 4, the UE checks and know slot corresponding to slot K1+4 is a valid uplink in the second COT. Therefore, the UE could transmit PUCCH with CAT-1 or CAT-2 LBT in slot K1+4 in the same PUCCH frequency resource as the previous PUCCH.

As shown in FIG. 23, a UE is allocated a previous PUCCH resource following PDSCH-to-HARQ-timing K1. The gNB initiates a second COT and transmits DL transmissions in the beginning slot(s), which blocks the LBT operation for the previous PUCCH at the UE. After decoding of DCI 2_0 in the 2nd COT which indicates an offset 2, the UE may check and know the slot corresponding to slot K1+2 is a valid uplink. Therefore, the UE could know that the gNB intentionally shifts the previous PUCCH to a new time position. The UE transmits PUCCH with CAT-1 or CAT-2 LBT in slot K1+2 in the same PUCCH frequency resource as the previous PUCCH resource.

In some aspects, details on transmission and retransmission of HARQ-ACK are discussed herein. In some aspects, the gNB triggers HARQ-ACK transmission for a current set of PDSCH and, if needed, a previous set of PDSCH. In some aspects, a DCI indicates a current set index and a previous set index, C-DAI is incremented based on the last DCI of the previous set, T-DAI indicates the total number of DCIs until now in the previous set and the current set. In some aspects, a set index is assigned to a set of PDSCHs, and HARQ-ACK is determined for the set of PDSCHs with the same set index. In some aspects, the set of PDSCHs includes PDSCHs with allocated PUCCH resource for the first time, PDSCHs never assigned a PUCCH resource and/or PDSCHs already assigned a PUCCH resource at an earlier time but failed in HARQ-ACK transmission. In some aspects, a DCI indicates a set index and a reset indicator; C-DAI is incremented across all DCIs with the same set index with reset indicator not toggled, the first DCI with reset indicator toggled has C-DAI equal to 1; T-DAI indicates the total number of DCIs till now across all DCIs with the same set index with reset indicator not toggled. In some aspects, one bit is added in DCI to indicate reporting the HARQ-ACK for earlier PDSCHs only, T-DAI is reinterpreted to indicate the set index of the set of PDSCHs. In some aspects, if there is no enough gNB processing time between a previous PUCCH and the current DCIs scheduling PDSCHs who's HARQ-ACK is on a current PUCCH, two indications of C-DAI/T-DAI are indicated in the DCI, one C-DAI/T-DAI counts number of all PDSCHs, while the other C-DAI/T-DAI only counts the number of PDSCHs scheduled by current DCIs. In some aspects, if there is not enough gNB processing time between a previous PUCCH and the current DCIs scheduling PDSCHs whose HARQ-ACK is on a current PUCCH, C-DAI/T-DAI in the current DCIs counts the number of all PDSCHs. In some aspects, reset indicator in a later DCI scheduling the set of PDSCHs is used to determine HARQ-ACK transmission of the set of PDSCHs. In some aspects, for semi-static HARQ-ACK transmission based on HARQ processes, the UE reports ACK for a HARQ process only one time. In some aspects, for semi-static HARQ-ACK transmission based on HARQ processes, a triggering DCI includes the latest value of NDI for a HARQ process if HARQ-ACK for the HARQ process is not correctly received; otherwise includes a toggled NDI for the HARQ process. In some aspects, for semi-static HARQ-ACK transmission based on HARQ processes, when the LTE reports its HARQ-ACK, UE includes the lastest NDI at the HE side for each HARQ process.

In some aspects, for semi-static HARQ-ACK transmission based on HARQ processes, the DCI includes one bit information indicating one of the following, whether to report HARQ-ACK for the latest PDSCH of a HARQ process whose HARQ-ACK is expected to transmit in a previous PUCCH for the first time HARQ-ACK feedback; or, if a previous PUCCH carrying HARQ-ACK is correctly received by gNB. In some aspects, if there is no enough gNB processing time between a previous PUCCH and the current DCIs scheduling PDSCHs whose HARQ-ACK is on a current PUCCH, PUCCH_NDI in a later DCI scheduling the set of HARQ processes is used to determine HARQ-ACK transmission of the set of HARQ processes. In some aspects, the schemes operate on all HARQ process as a whole or operate on a subset of HARQ processes separately. In some aspects, a subset of HARQ processes is explicitly indicated in the triggering DCI; or, the HARQ process indicated in the triggering DCI implicitly indicate a subset of HARQ processes. In some aspects, in a DCI, a second HARQ process number is included and is used in forming a HARQ-ACK codebook. In some aspects, for semi-static HARQ-ACK transmission based on configured PDSCH-to-HARQ-ACK timing, HARQ-ACK bits for X slots are additionally added to the HARQ-ACK codebook to account for DCI without valid PDSCH-to-HARQ-ACK timing. In some aspects, SFI is used to reduce the codebook size; if DL or UL BWP switching happens, impacted HARQ-ACK is removed; for a slot outside gNB-initiated COT, no HARQ-ACK is allocated. In some aspects, a DCI indicates 1-bit information on the LBT type for PUCCH. In some aspects, for a group of UEs fail in PUCCH transmission with CAT-4 LBT derived by a previous indicated PDSCH-to-HARQ-ACK-timing K1, the timing of a new PUCCH is derived by K1 and the time offset $\Delta$, K1+$\Delta$, $\Delta$ is signaled in a group-triggering DCI.

Figure 24:
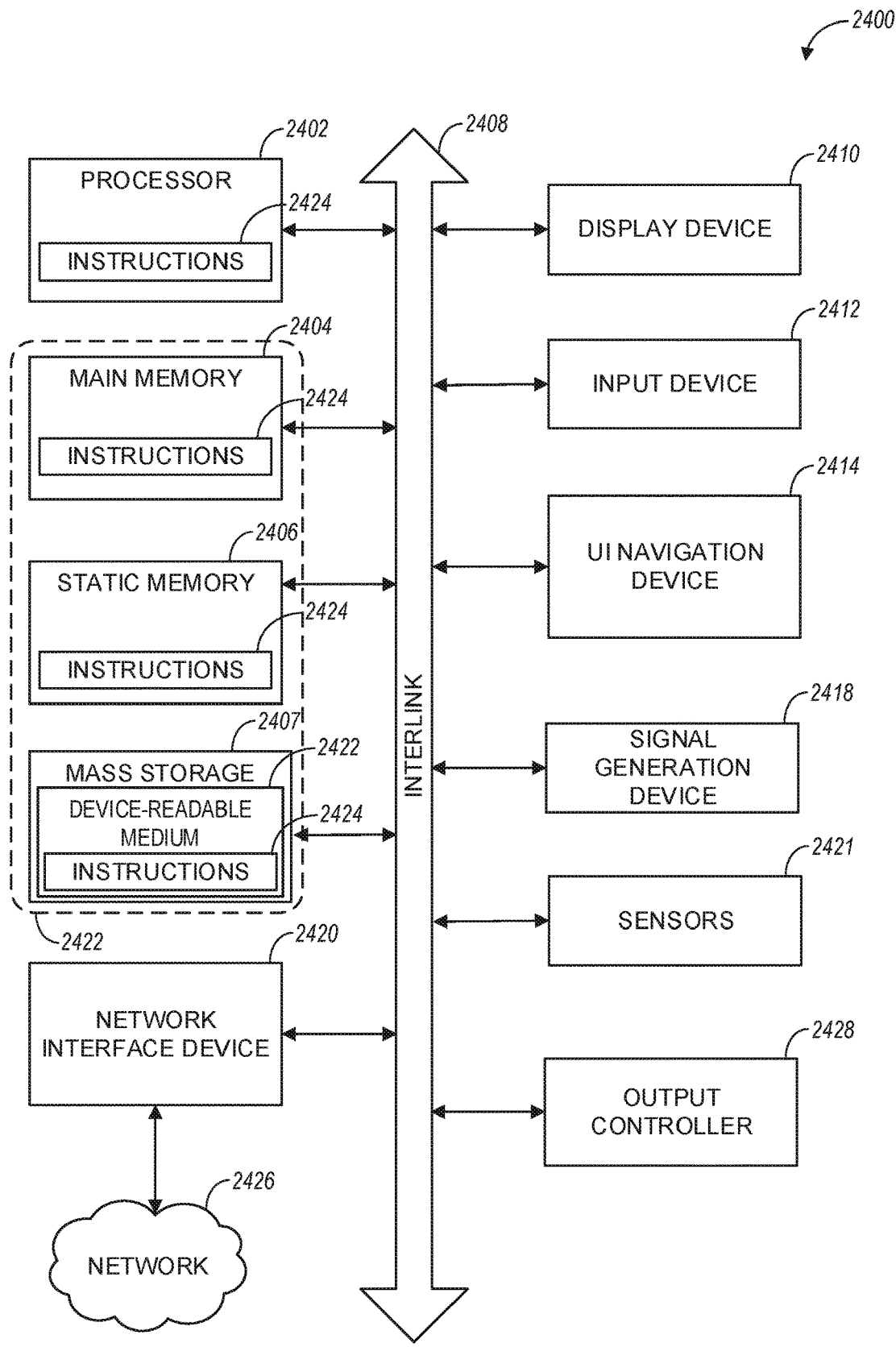
FIG. 24 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 24 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 2400 may operate as a standalone device or may be connected (e.g., networked) to other communication devices.

Circuitry (e.g., processing circuitry) is a collection of circuits implemented in tangible entities of the device 2400 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to catty out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 2400 follow.

In some aspects, the device 2400 may operate as a standalone device or may be connected (e.g., networked) to other devices. In a networked deployment, the communication device 2400 may operate in the capacity of a server communication device, a client communication device, or both in server-client network environments. In an example, the communication device 2400 may act as a peer communication device in peer-to-peer (P2P) (or other distributed) network environment. The communication device 2400 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. in an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 2400 may include a hardware processor 2402 (e.g., a central processing unit (CPU), a graphics processing unit (GPU), a hardware processor core, or any combination thereof), a main memory 2404, a static memory 2406, and mass storage 2407 (e.g., hard drive, tape drive, flash storage, or other block or storage devices), some or all of which may communicate with each other via an interlink (e.g., bus) 2408.

The communication device 2400 may further include a display device 2410, an alphanumeric input device 2412 (e.g., a keyboard), and a user interface (UI) navigation device 2414 (e.g., a mouse). In an example, the display device 2410, input device 2412 and UI navigation device 2414 may be a touchscreen display. The communication device 2400 may additionally include a signal generation device 2418 (e.g., a speaker), a network interface device 2420, and one or more sensors 2421, such as a global positioning system (GPS) sensor, compass, accelerometer, or another sensor. The communication device 2400 may include an output controller 2428, such as a serial (e.g., universal serial bus (USB), parallel, or other wired or wireless (e.g., infrared (IR), near field communication (NEC), etc.) connection to communicate or control one or more peripheral devices (e.g., a printer, card reader, etc.).

The storage device 2407 may include a communication device-readable medium 2422, on which is stored one or more sets of data structures or instructions 2424 (e.g., software) embodying or utilized by any one or more of the techniques or functions described herein. In some aspects, registers of the processor 2402, the main memory 2404, the static memory 2406, and/or the mass storage 2407 may be, or include (completely or at least partially), the device-readable medium 2422, on which is stored the one or more sets of data structures or instructions 2424, embodying or utilized by any one or more of the techniques or functions described herein. In an example, one or any combination of the hardware processor 2402, the main memory 2404, the static memory 2406, or the mass storage 2416 may constitute the device-readable medium 2422.

As used herein, the term "device-readable medium" is interchangeable with "computer-readable medium" or "machine-readable medium". While the communication device-readable medium 2422 is illustrated as a single medium, the term "communication device-readable medium" may include a single medium or multiple media (e.g., a centralized or distributed database, and/or associated caches and servers) configured to store the one or more instructions 2424. The term "communication device-readable medium" is inclusive of the terms "machine-readable medium" or "computer-readable medium", and may include any medium that is capable of storing, encoding, or carrying instructions (e.g., instructions 2424) for execution by the communication device 2400 and that cause the communication device 2400 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 2424 may further be transmitted or received over a communications network 2426 using a transmission medium via the network interface device 2420 utilizing any one of a number of transfer protocols. In an example, the network interface device 2420 may include one or more physical jacks (e.g., Ethernet, coaxial, or phone jacks) or one or more antennas to connect to the communications network 2426. In an example, the network interface device 2420 may include a plurality of antennas to wirelessly communicate using at least one of single-input-multiple-output (SIMO), MIMO, or multiple-input-single-output (MISO) techniques. In some examples, the network interface device 2420 may wirelessly communicate using Multiple User MIMO techniques.

The term "transmission medium" shall be taken to include any intangible medium that is capable of storing, encoding or carrying instructions for execution by the communication device 2400, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus to be used in a user equipment (UE), the apparatus comprising:
    processing circuitry, wherein to configure the UE for hybrid automatic repeat request acknowledgment (HARQ-ACK) transmission in a New Radio (NR) network, the processing circuitry is to:
        decode radio resource control (RRC) signaling, the RRC signaling including information to configure the UE for a HARQ-ACK codebook for physical downlink shared channel (PDSCH) transmissions;
        decode a first PDSCH scheduled by a first downlink control information (DCI) format, the first DCI format including a PDSCH group index of the first PDSCH;
        decode a second DCI format, the second DCI format received after the first DCI format, and the second DCI format including the PDSCH group index of the first PDSCH;
        decode a second PDSCH scheduled by the second DCI format; and
        multiplex HARQ-ACK information for the first PDSCH scheduled by the first DCI format and HARQ-ACK information for the second PDSCH scheduled by the second DCI format for transmission in a physical uplink control channel (PUCCH), when the HARQ-ACK codebook configured by the RRC signaling is a dynamic HARQ-ACK codebook and the first DCI format and the second DCI format include the PDSCH group index of the first PDSCH; and
    memory coupled to the processing circuitry and configured to store the PDSCH group index.

2. The apparatus of claim 1, wherein the processing circuitry is to:
    decode the second DCI format to obtain a PDSCH-to-HARQ feedback timing indicator providing timing for uplink HARQ-ACK transmission; and
    multiplex the HARQ-ACK information for the first PDSCH and the HARQ-ACK information for the second PDSCH associated with the PDSCH group index of the first PDSCH, for transmission in the PUCCH in a slot indicated by the PDSCH-to-HARQ_feedback timing indicator.

3. The apparatus of claim 1, wherein the processing circuitry is to:
    decode second RRC signaling, the second RRC signaling including:
    information configuring reporting of acknowledgement (ACK) or non-acknowledgement (NACK)(A/N) for multiple HARQ-ACK processes; and
    information configuring inclusion of a new data indicator (NDI) for each A/N of the multiple HARQ-ACK processes.

4. The apparatus of claim 3, wherein the first DCI format includes a first NDI for the first PDSCH and the second DCI format includes a second NDI for the second PDSCH.

5. The apparatus of claim 4, wherein the processing circuitry is to:
    include the first NDI and the second NDI with the multiplexed HARQ-ACK information for the first PDSCH and HARQ-ACK information for the second PDSCH, when the second RRC signaling includes the information configuring inclusion of the NDI for each A/N of the multiple HARQ-ACK processes.

6. The apparatus of claim 1, wherein the processing circuitry is to:
    encode the HARQ-ACK information for the first PDSCH and the HARQ-ACK information for the second PDSCH for separate transmissions in the PUCCH, when the HARQ-ACK codebook configured by the RRC signaling is a static HARQ-ACK codebook.

7. The apparatus of claim 1, wherein the first DCI format includes a reset indicator for the first PDSCH, and the second DCI format includes a second reset indicator for the second PDSCH.

8. The apparatus of claim 7, wherein the processing circuitry is to:
compare the second reset indicator with the first reset indicator to determine a reset indicator toggle status.

9. The apparatus of claim 8, wherein the processing circuitry is to:
encode the PUCCH for transmission to a base station, the PUCCH encoded to include the HARQ-ACK information for the first PDSCH, without including the HARQ-ACK information for the second PDSCH, when the reset indicator toggle status indicates the second reset indicator is toggled in comparison with the first reset indicator.

10. A non-transitory computer-readable storage medium that stores instructions for execution by one or more processors of a user equipment (UE), the instructions to configure the one or more processors for hybrid automatic repeat request acknowledgment (HARQ-ACK) transmission in a New Radio (NR) network and to cause the UE to:
decode radio resource control (RRC) signaling, the RRC signaling including information to configure the UE for a HARQ-ACK codebook for physical downlink shared channel (PDSCH) transmissions;
decode a first PDSCH scheduled by a first downlink control information (DCI) format, the first DCI format including a PDSCH group index of the first PDSCH;
decode a second DCI format, the second DCI format received after the first DCI format, and the second DCI format including the PDSCH group index of the first PDSCH;
decode a second PDSCH scheduled by the second DCI format; and
multiplex HARQ-ACK information for the first PDSCH scheduled by the first DCI format and HARQ-ACK information for the second PDSCH scheduled by the second DCI format for transmission in a physical uplink control channel (PUCCH), when the HARQ-ACK codebook configured by the RRC signaling is a dynamic HARQ-ACK codebook and the first DCI format and the second DCI format include the PDSCH group index of the first PDSCH.

11. The non-transitory computer-readable storage medium of claim 10, wherein executing the instructions causes the UE to:
decode the second DCI format to obtain a PDSCH-to-HARQ feedback timing indicator providing timing for uplink HARQ-ACK transmission; and
multiplex the HARQ-ACK information for the first PDSCH and the HARQ-ACK information for the second PDSCH associated with the PDSCH group index of the first PDSCH, for transmission in the PUCCH in a slot indicated by the PDSCH-to-HARQ_feedback timing indicator.

12. The non-transitory computer-readable storage medium of claim 10, wherein executing the instructions causes the UE to:
decode second RRC signaling, the second RRC signaling including:
information configuring reporting of acknowledgement (ACK) or non-acknowledgement (NACK) (A/N) for multiple HARQ-ACK processes; and
information configuring inclusion of a new data indicator (NDI) for each A/N of the multiple HARQ-ACK processes.

13. The non-transitory computer-readable storage medium of claim 12, wherein the first DCI format includes a first NDI for the first PDSCH and the second DCI format includes a second NDI for the second PDSCH.

14. The non-transitory computer-readable storage medium of claim 13, wherein executing the instructions causes the UE to:
include the first NDI and the second NDI with the multiplexed HARQ-ACK information, when the second RRC signaling includes the information configuring inclusion of the NDI for each A/N of the multiple HARQ-ACK processes.

15. The non-transitory computer-readable storage medium of claim 10, wherein executing the instructions causes the UE to:
encode the HARQ-ACK information for the first PDSCH and the HARQ-ACK information for the second PDSCH for separate transmissions in the PUCCH, when the HARQ-ACK codebook configured by the RRC signaling is a static HARQ-ACK codebook.

16. The non-transitory computer-readable storage medium of claim 10, wherein the first DCI format includes a reset indicator for the first PDSCH, and the second DCI format includes a second reset indicator for the second PDSCH.

17. The non-transitory computer-readable storage medium of claim 16, wherein executing the instructions causes the UE to:
compare the second reset indicator with the first reset indicator to determine a reset indicator toggle status.

18. The non-transitory computer-readable storage medium of claim 17, wherein executing the instructions causes the UE to:
encode the PUCCH for transmission to a base station, the PUCCH encoded to include the HARQ-ACK information for the first PDSCH, without including the HARQ-ACK information for the second PDSCH, when the reset indicator toggle status indicates the second reset indicator is toggled in comparison with the first reset indicator.

19. A non-transitory computer-readable storage medium that stores instructions for execution by one or more processors of a base station, the instructions to configure the one or more processors for hybrid automatic repeat request acknowledgment (HARQ-ACK) processing in a New Radio (NR) network and to cause the base station to:
encode radio resource control (RRC) signaling for transmission to a user equipment (UE), the RRC signaling including information to configure the UE for a HARQ-ACK codebook for physical downlink shared channel (PDSCH) transmissions;
encode a first PDSCH scheduled by a first downlink control information (DCI) format, the first DCI format including a PDSCH group index of the first PDSCH;
encode a second DCI format for transmission using a physical downlink control channel (PDCCH), the second DCI format transmitted after the first DCI format, and the second DCI format including the PDSCH group index of the first PDSCH;
encode a second PDSCH scheduled by the second DCI format; and
decode multiplexed HARQ-ACK information for the first PDSCH scheduled by the first DCI format and HARQ-ACK information for the second PDSCH scheduled by the second DCI format received via a physical uplink control channel (PUCCH), the HARQ-ACK information for the first PDSCH and the HARQ-ACK information for second PDSCH being multiplexed when the HARQ-ACK codebook configured by the RRC signaling is a dynamic HARQ-ACK codebook, and the first DCI format and the second DCI format include the PDSCH group index of the first PDSCH.

20. The non-transitory computer-readable storage medium of claim 19, wherein executing the instructions causes the base station to:
   encode the second DCI format to include a PDSCH-to-HARQ feedback timing indicator providing timing for uplink HARQ-ACK transmission; and
   decode the multiplexed HARQ-ACK information for the first PDSCH and the HARQ-ACK information for the second PDSCH associated with the PDSCH group index, the multiplexed HARQ-ACK information received via the PUCCH in a slot indicated by the PDSCH-to-HARQ feedback timing indicator.

* * * * *

UNITED STATES PATENT AND TRADEMARK OFFICE
CERTIFICATE OF CORRECTION

| | |
|---|---|
| PATENT NO. | : 11,563,545 B2 |
| APPLICATION NO. | : 16/724180 |
| DATED | : January 24, 2023 |
| INVENTOR(S) | : Li et al. |

It is certified that error appears in the above-identified patent and that said Letters Patent is hereby corrected as shown below:

On the Title Page

In item (57), in "Abstract", in Column 2, Line 4, delete "PDSCH." and insert --PDCCH.-- therefor In the Claims In Column 28, Lines 30-31, in Claim 2, delete "PDSCH-to-HARQ feedback" and insert --PDSCH-to-HARQ_feedback-- therefor In Column 28, Line 45, in Claim 3, delete "(NACK)(A/N)" and insert --(NACK) (A/N)-- therefor In Column 29, Lines 51-52, in Claim 11, delete "PDSCH-to-HARQ feedback" and insert --PDSCH-to-HARQ_feedback-- therefor In Column 31, Lines 12-13, in Claim 20, delete "PDSCH-to-HARQ feedback" and insert --PDSCH-to-HARQ_feedback-- therefor In Column 31, Line 20, in Claim 20, delete "PDSCH-to-HARQ feedback" and insert --PDSCH-to-HARQ_feedback-- therefor Signed and Sealed this
Sixth Day of February, 2024

Katherine Kelly Vidal
*Director of the United States Patent and Trademark Office*